United States Patent
Wang et al.

(10) Patent No.: US 12,395,467 B2
(45) Date of Patent: *Aug. 19, 2025

(54) INTERWORKING BETWEEN IoT SERVICE LAYER SYSTEMS AND DISTRIBUTED LEDGER SYSTEMS

(71) Applicant: Convida Wireless, LLC, Wilmington, DE (US)

(72) Inventors: Chonggang Wang, Princeton, NJ (US); Quang Ly, North Wales, PA (US); Xu Li, Plainsboro, NJ (US); Lu Liu, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,515

(22) Filed: May 15, 2024

(65) Prior Publication Data

US 2024/0388572 A1 Nov. 21, 2024

Related U.S. Application Data

(63) Continuation of application No. 17/051,803, filed as application No. PCT/US2019/031126 on May 7, 2019, now Pat. No. 12,021,840.

(Continued)

(51) Int. Cl.
*H04L 29/06* (2006.01)
*H04L 9/32* (2006.01)
(Continued)

(52) U.S. Cl.
CPC ........ *H04L 63/0281* (2013.01); *H04L 9/3236* (2013.01); *H04L 63/12* (2013.01);
(Continued)

(58) Field of Classification Search
USPC .......................................................... 726/12
See application file for complete search history.

(56) References Cited

U.S. PATENT DOCUMENTS

| 2015/0029894 A1 | 1/2015 | Lu et al. |
| 2016/0164884 A1 | 6/2016 | Sriram et al. |
| (Continued) | | |

FOREIGN PATENT DOCUMENTS

| CN | 105474670 A | 4/2016 |
| CN | 107430755 A | 12/2017 |
| WO | 2017/004527 A1 | 1/2017 |

OTHER PUBLICATIONS

Shinsaku Kiyomoto et al., "On Blockchain-based authorization architecture for beyond-5G mobile services", 2017 12th International Conference For Internet Technology And Secured Transactions (Icitst), Infonomics Society, Dec. 11, 2017, pp. 136-141. (Year: 2017) (Year: 2017).*

(Continued)

*Primary Examiner* — Sanchit K Sarker
(74) *Attorney, Agent, or Firm* — BakerHostetler

(57) ABSTRACT

A distributed ledger interworking architecture is described wherein a distributed ledger proxy interfaces with IoT service layer systems and distributed ledger systems. Service layer nodes may interact with the distributed ledger proxy to leverage functions provided by distributed ledger systems, such as to request that the distributed ledger proxy insert some service layer information into the distributed ledgers. A distributed ledger proxy can support multiple service layer nodes and may interface to multiple different distributed ledger systems.

20 Claims, 33 Drawing Sheets

Related U.S. Application Data

(60) Provisional application No. 62/667,814, filed on May 7, 2018.

(51) Int. Cl.
  *H04L 9/40* (2022.01)
  *H04L 67/104* (2022.01)
  *H04L 67/12* (2022.01)
  *H04L 67/566* (2022.01)
  *H04L 67/567* (2022.01)
  *H04L 9/00* (2022.01)

(52) U.S. Cl.
  CPC ............ *H04L 67/104* (2013.01); *H04L 67/12* (2013.01); *H04L 67/566* (2022.05); *H04L 67/567* (2022.05); *H04L 9/50* (2022.05); *H04L 2463/102* (2013.01)

(56) References Cited

U.S. PATENT DOCUMENTS

| | | |
|---|---|---|
| 2018/0039942 A1 | 2/2018 | Rogers et al. |
| 2018/0337847 A1* | 11/2018 | Li ...................... H04L 67/1029 |
| 2019/0073666 A1* | 3/2019 | Ortiz ..................... H04L 9/3236 |
| 2019/0342149 A1 | 11/2019 | Guo et al. |
| 2020/0231194 A1 | 7/2020 | Schicker et al. |
| 2020/0232194 A1* | 7/2020 | Periaswamy ............. G01F 1/32 |

OTHER PUBLICATIONS

"oneM2M- Functional Architecture; Y.4500.1 (01/18) ", ITU-T Standard Y.4500.1, International Telecommunication Union, Geneva ; CH, Jan. 13, 2018 (Jan. 13, 2018), pp. 1-422.

Shinsaku et al., "On blockchain-based authorization architecture for beyond-5G mobile services", 2017 12th International Conference For Internet Technology And Secured Transactions (Icitst), Infonomics Society, Dec. 11, 2017, pp. 136-141.

* cited by examiner

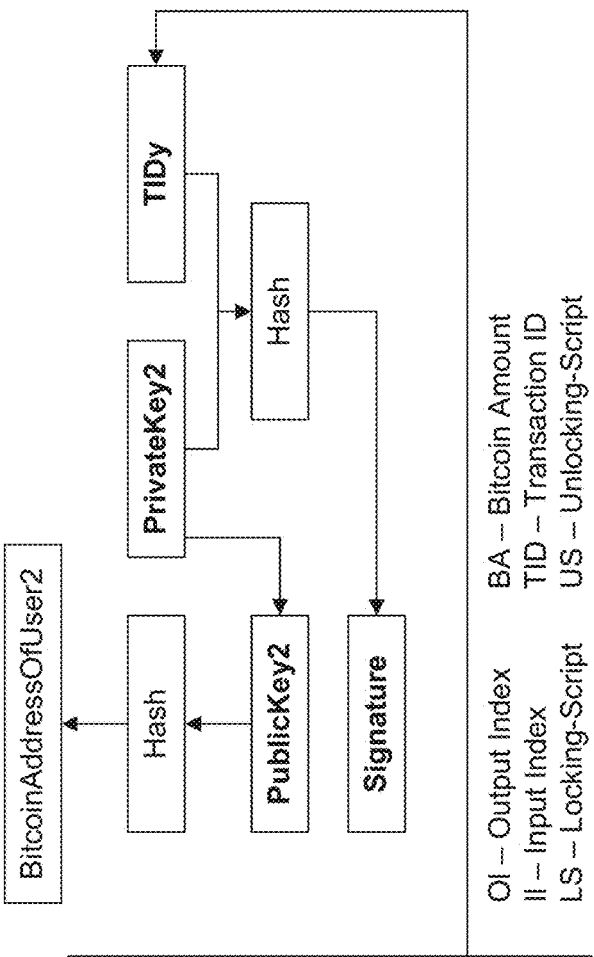

- Each User has a Pair of Unique (PrivateKey, PublicKey). PublicKey is Based on PrivateKey.
- PublicKey it is Used to Generate a Unique Bitcoin Address. Bitcoin Address is Public.
- Bitcoin Address or PublicKey Contained in an Unspent Transaction Output (UTXO) Indicate the Payee.
- PrivateKey is Used to generate a Signature, which will be Used Together with Public Key by the Payer to Unlock an UTXO.
- Inputs in a Transaction Contains the Reference of One or More UTXOs, which have been Included in Previous Transactions.

Transaction TIDx
(User1 Makes Payment to User2 and User4)

Inputs
......

Outputs
| OI | BA | LS |
|---|---|---|
| 0 | 0.1 | BitcoinAddressOfUser4 (or PublicKey4) |
| 1 | 0.2 | BitcoinAddressOfUser2 (or PublicKey2) |

Transaction TIDy
(User2 uses the Bitcoin (Received from User1 in TIDx) to make Payment to User3; 0.04 is the Change Returned Back to User2)

Inputs
| II | TID | OI | US |
|---|---|---|---|
| 0 | TIDx | 1 | PublicKey2 + Signature |

Outputs
| OI | BA | LS |
|---|---|---|
| 0 | 0.15 | BitcoinAddressOfUser3 (or PublicKey3) |
| 1 | 0.04 | BitcoinAddressOfUser2 (or PublicKey2) |

OI – Output Index    BA – Bitcoin Amount
II – Input Index    TID – Transaction ID
LS – Locking-Script    US – Unlocking-Script

FIG. 6

DLS Transaction Header

| issuerID | recipientID | otherFields | 
|---|---|---|
| "SLN2DLSID" | "SLN1DLSID" | Specific to the DLS |

DLS Transaction Payload

| txPayload | Signature |
|---|---|
| | Hash (Header + Payload, SLN2's Private Key) |

| txPurpose | slInfoType | numOfSlInfo | slInfoSize | slInfoContent | slInfoSize | slInfoContent |
|---|---|---|---|---|---|---|
| "Interworking with SLS1" | "Original (no Hash)" | "2" | "100" Bytes | "This is the First Piece of SL info" | "150" Bytes | "This is the Second Piece of SL info" |

FIG. 17

Configure a DLP

- Address or URI Including Port Number
- Types of SL Messages to be Stored in the Ledger
- ......

Display a DLP's Information

- Address and/or URI Including Port Number
- Type of Ledgers (e.g., Public, Private, etc.)
- Consensus Protocol
- Peer-to-peer Network Protocol
- ......

FIG. 27

Display SLN Information

- SLN Address or its URI Including Port Number
- Last Time when the SLN Sends a Message or Transaction to DLP
- Number of Messages/transactions which the SLN has Sent to DLP
- ......

Display Ledger Information

- The Latest Transaction Set Being Added to the Ledger
- The Number of Transactions from a Specific SLN During a time Period
- The Elapsed Time from the Last Transaction Set
- The Transaction Generation Speed
- The Transaction Set Generation Speed
- ......

FIG. 28

INTERWORKING BETWEEN IoT SERVICE LAYER SYSTEMS AND DISTRIBUTED LEDGER SYSTEMS

CROSS-REFERENCE TO RELATED APPLICATIONS

This application is a continuation of U.S. patent application Ser. No. 17/051,803 filed Oct. 30, 2020 which is the National Stage of International Patent Application No. PCT/US2019/031126, filed May 7, 2019, which claims the benefit of U.S. Provisional Patent Application No. 62/667,814, filed May 7, 2018, the disclosures of which are incorporated herein by reference in their entireties.

BACKGROUND

The oneM2M standard defines a Service Layer embodied in one or more network entities each called a "Common Service Entity" (CSE). The purpose of the Service Layer is to provide "horizontal" services that can be utilized by different "vertical" M2M systems and applications. The CSE supports four reference points. The Mca reference point interfaces with the Application Entity (AE). The Mcc reference point interfaces with another CSE within the same service provider domain and the Mcc' reference point interfaces with another CSE in a different service provider domain. The Men reference point interfaces with the underlying network service entity (NSE). An NSE provides underlying network services to the CSEs, such as device management, location services and device triggering. A CSE contains multiple logical functions called "Common Service Functions" (CSFs), such as "Discovery" and "Data Management & Repository."

SUMMARY

Methods and systems are disclosed for interworking between IoT service layer systems and distributed ledger systems. A distributed ledger interworking architecture is described wherein a distributed ledger proxy interfaces with IoT service layer systems and distributed ledger systems. Service layer nodes may interact with the distributed ledger proxy to leverage functions provided by distributed ledger systems, such as to request that the distributed ledger proxy insert some service layer information into the distributed ledgers. A distributed ledger proxy can support multiple service layer nodes and may interface to multiple different distributed ledger systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 6 shows a flow chart of an example transaction structure in Bitcoin Systems;

FIG. 17 shows an example of a distributed layer system transaction;

FIG. 27 shows an example user interface for a service layer node;

FIG. 28 shows an example user interface for a distributed ledger proxy;

DETAILED DESCRIPTION OF ILLUSTRATIVE EMBODIMENTS

Figure 1:
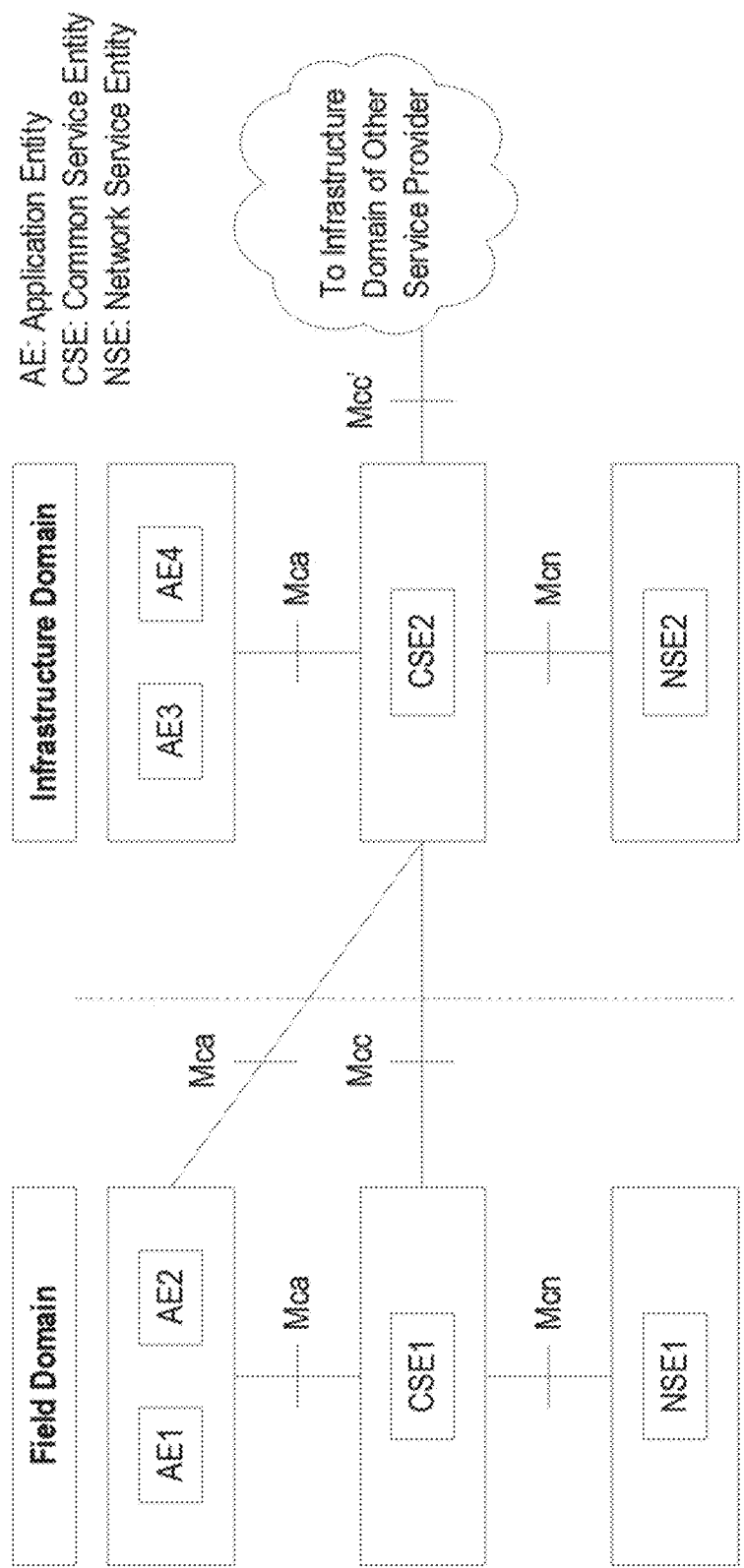
FIG. 1 shows an example block diagram of a oneM2M architecture.

The oneM2M architecture (see oneM2M-TS-0001 oneM2M Functional Architecture-V3.10.0, February 2018) enables the following types of Nodes as shown in FIG. 1:

Application Service Node (ASN): a node that contains one CSE and contains at least one Application Entity (AE). Example of physical mapping: an ASN could reside in an M2M Device;

Application Dedicated Node (ADN): a node that contains at least one AE and does not contain a CSE. There may be zero or more ADNs in the Field Domain of the oneM2M System. Example of physical mapping: an ADN could reside in a constrained M2M device;

Middle Node (MN): a node that contains one CSE and contains zero or more AEs. There may be zero or more MNs in the Field Domain of the oneM2M System. Example of physical mapping: a MN could reside in an M2M Gateway;

Infrastructure Node (IN): a node that contains one CSE and contains zero or more AEs. There may be exactly one IN in the Infrastructure Domain per oneM2M Service Provider. A CSE in an IN may contain CSE functions not applicable to other node types. Example of physical mapping: an IN could reside in an M2M Service Infrastructure; and Non-oneM2M Node (NoDN): A Node that does not contain oneM2M Entities (neither AEs nor CSEs). Such Nodes represent devices attached to the oneM2M system for interworking purposes such as management.

Figure 2:
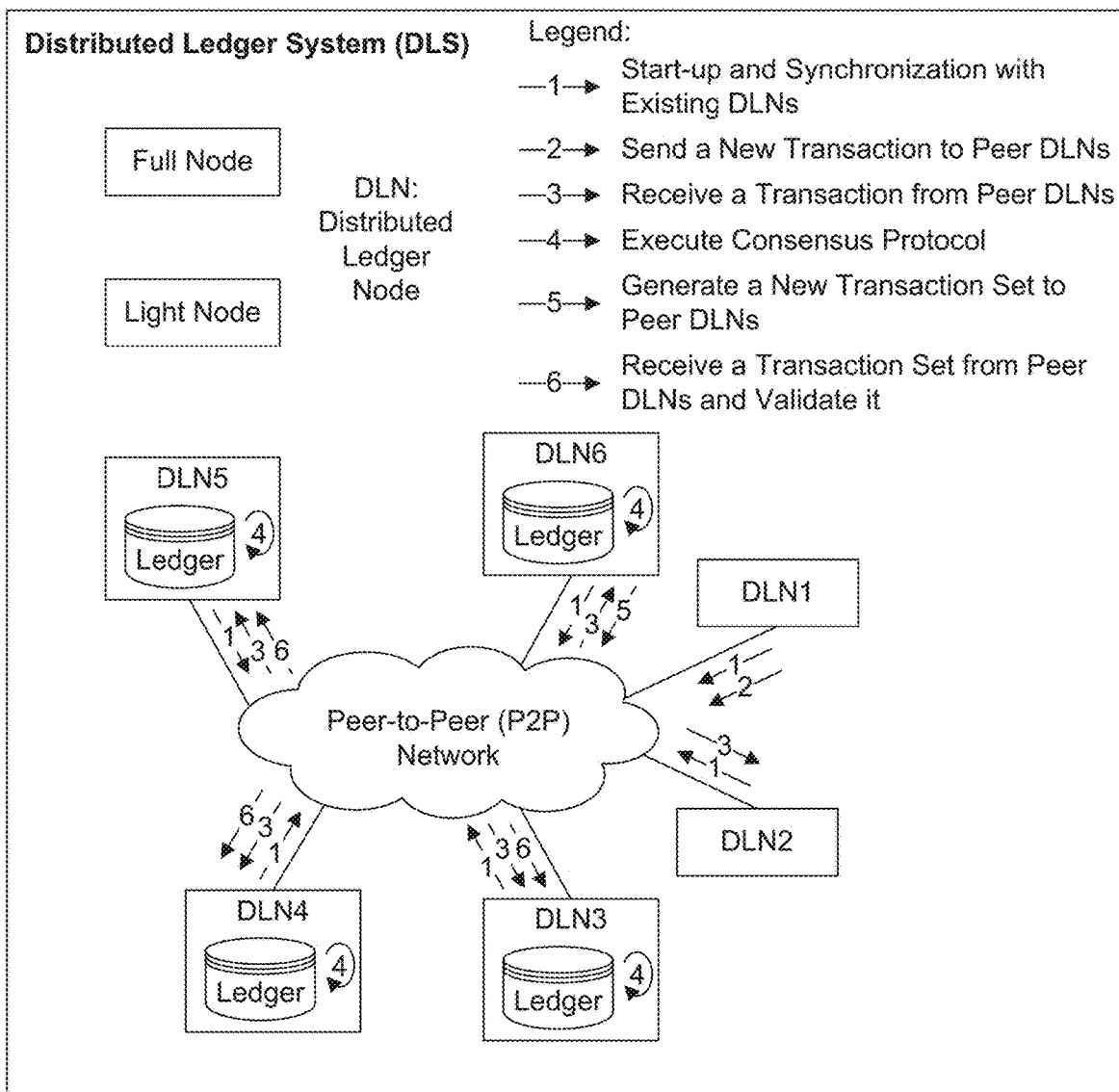
FIG. 2 shows an example block diagram of a distributed ledger system architecture.

An example instance of a Distributed Ledger (DL) transaction in which DLN1 sends a transaction to peer Distributed Ledger Nodes (DLNs) is shown in FIG. 2. This figure also illustrates a general Distributed Ledger Systems (DLS) architecture, where DLNs may connect with each other via an underlying Peer-to-Peer (P2P) network and participate in the system. There are some existing DLSs such as Bitcoin systems and Ethereum systems. A DLN may have several other DLNs as its peer neighbors, dependent on the underlying P2P networking protocol. A DLN could be a full node or a light node. A full DLN node (e.g., a miner in Bitcoin systems) maintains a complete ledger, which keeps growing due to the newly appended transactions to it. A light DLN node (e.g., the wallet client software in Bitcoin systems) does not maintain the complete ledger but may only handle transactions from or to it. In general, the following operations are independently performed at each DLN node so that a complete and consistent ledger may be continuously formed and maintained at each full DLN node. It is understood that these operations are exemplary only and that some of the operations may not be required for a light DLN node.

At phase 1, after start-up, a DLN discovers and selects some existing DLNs as its peer neighbors (e.g., via Domain Name System based Service Discovery (DNS-SD)), and connects to the P2P network. Then, it synchronizes with its neighboring DLNs by downloading the current ledger from them and may also exchange public keys or other similar credentials.

At phase 2, the DLN generates a new transaction and may sign it using its private key. This DLN may be the issuer of this transaction (e.g., the payer in Bitcoin system). Then, it sends the signed transaction to its neighboring DLNs, which may relay the transaction to their neighbors as well. Eventually, the new transaction may be received by all DLNs in the system.

At phase 3, a DLN receives the new transaction and can verify the transaction using the public key of the sending DLN.

At phase 4, each full DLN node independently executes a certain consensus protocol (e.g., Proof-of-Work (PoW) in Bitcoin systems) and generates a Transaction Set (e.g., a block in Bitcoin systems) which contains a set of newly generated but not confirmed transactions. The DLN node that is the first to generate a Transaction Set meeting the requirement provided by the DLS is declared the winner. In other words, only the winner out of the consensus protocol generates the new Transaction Set and sends it to the P2P network for validation. Note that this Transaction Set usually contains a previous transaction reference to the last Transaction Set of the current ledger; the previous transaction reference helps to append this Transaction Set to the current ledger in phase 6.

At phase 5, the winner (e.g., DLN6 in this example) generates and sends the Transaction Set to the P2P network.

At phase 6, a DLN (e.g., DLN3, DLN4, and DLN5 in this example) receives the Transaction Set and validates it according to the same consensus protocol. At each DLN, the validated Transaction Set may be appended to the current ledger, which implies that all transactions contained in the Transaction Set are now confirmed; as a result, the DLS system status (e.g., Unspent Bitcoins in Bitcoin systems) is updated independently and automatically at each DLN by incorporating changes from all transactions in the confirmed Transaction Set. Until this step, the whole DLS reaches a new status, which will be updated by future Transaction Sets.

From the example shown in FIG. 2: 1) DLN1 and DLN2 are light nodes and may only be involved in phase 1, phase 2, and phase 3; 2) DLN1 generates a new transaction, which is received by all other DLNs; 3) DLN3-DLN6 are full nodes and conduct a consensus protocol independently, and DLN6 is the winner; 4) Each full node maintains a separate ledger but with the same list of transaction sets (e.g., a growing number of validated Transaction Sets).

Many DLSs (e.g., Bitcoin systems) have been designed with the following features and advantages:

The data integrity of each transaction is protected by using the sending DLN's private key to sign the transaction;

The sending DLN only exposes its public key or a hash of the public key, not its real identity. Thus, the privacy from an identity perspective is protected;

Since each full DLN maintains a separate and complete ledger, there is no single point of failure and it is almost impossible to tamper with the ledger; and DLNs do not need a pre-established trust among them, but independently perform the consensus protocol, which in some DLSs (e.g., PoW in Bitcoin systems) needs intensive computation and the cost to attack the ledger will be extremely high.

A DLS could be used by public users without any pre-established permission or trust and is referred to as a public ledger or a permissionless ledger (e.g., Bitcoin Systems). In contrast, a private ledger or a permissioned ledger (e.g., hyperledger systems) is a DLS which is used only for certain permissioned users (e.g., users inside an organization). Another difference between these two types of DLSs is that private ledgers may use simple consensus protocols since users in a private ledger have already established certain trust.

Figure 3:
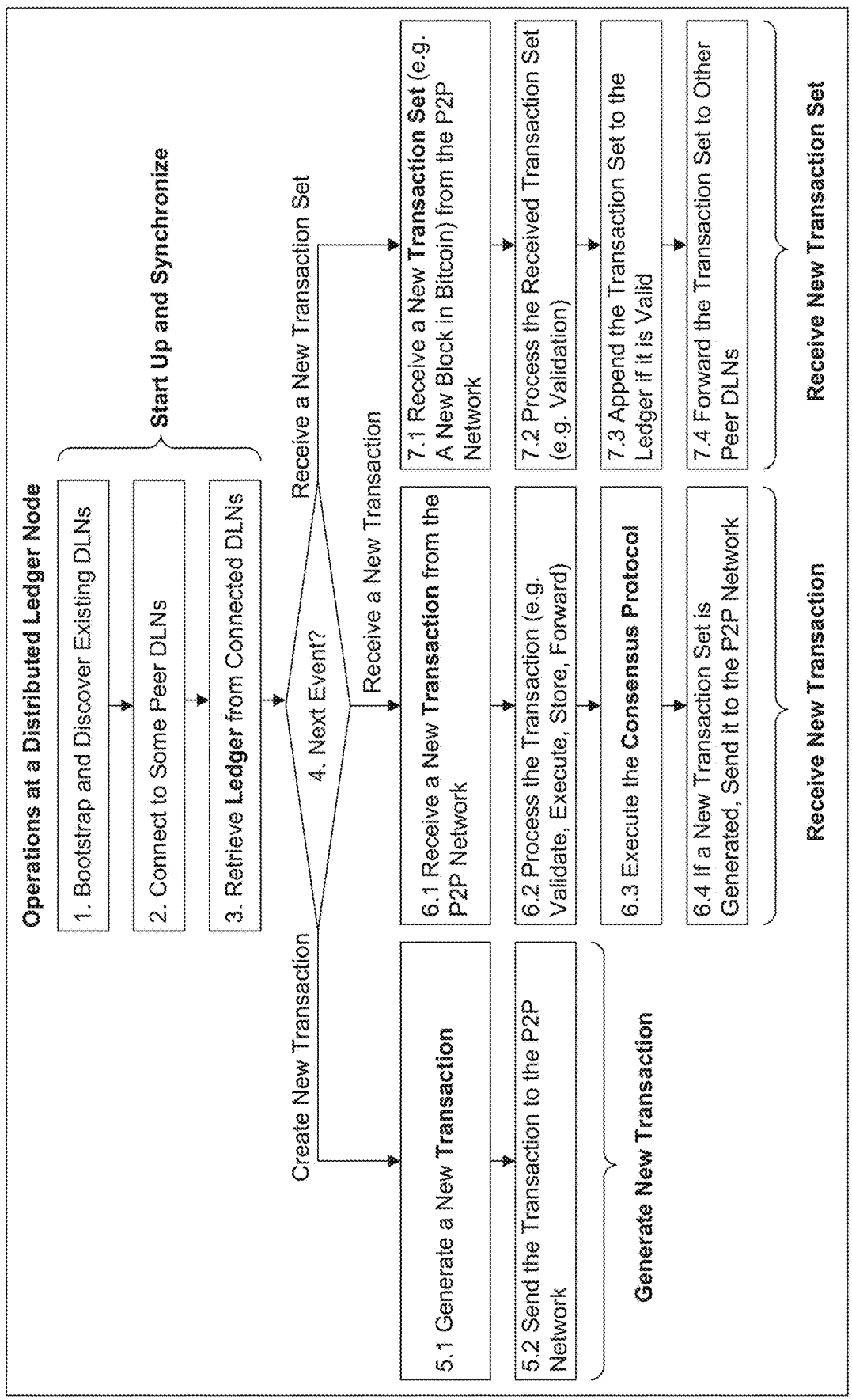
FIG. 3 shows a flow chart of example operations performed at a distributed ledger node.

Based on the general architecture illustrated in FIG. 2, FIG. 3 illustrates example operation details at a DLN, which may consist of the following steps (although the details may vary for a specific DLS). It is understood that each DLN may conduct these steps independently.

At step 1, the DLN starts up and discovers existing DLNs.

At step 2, the DLN connects to one or more discovered DLNs dependent on the underlying P2P protocol and may exchange public keys or similar credentials with each other.

At step 3, the DLN retrieves the current ledger from one or more discovered DLNs.

At step 4, the DLN waits for upcoming events or triggers (e.g., generate a new transaction, receive a new Transaction Set, or receive a new Transaction).

Both steps 5.1 and 5.2 may be triggered when there is a need to generate a new transaction.

At step 5.1, the DLN assembles a new transaction. The DLN may sign the transaction using its private key. The transaction structure varies in different DLS. For example, FIG. 6 (discussed below) illustrates the transaction structure in Bitcoin system.

At step 5.2, the DLN sends the transaction to its neighboring DLNs.

Steps 6.1-6.4 may be triggered when the DLN receives a new transaction.

At step 6.1, the DLN receives a new transaction from the P2P network.

At step 6.2, the DLN validates the transaction, which could be to check if the issuer of this transaction has enough unspent Bitcoins in the ledger to support this transaction in the Bitcoin system. If the transaction is valid, the DLN may store it in the transaction pool waiting for executing consensus protocol, and may also forward it to neighboring DLNs. In some systems (e.g., Ethereum), the transaction may be sent to a contract account in the ledger and may cause the execution of the contract code contained in the contract account. Note that a transaction may not be validated until the completion of the consensus protocol.

Figure 5:
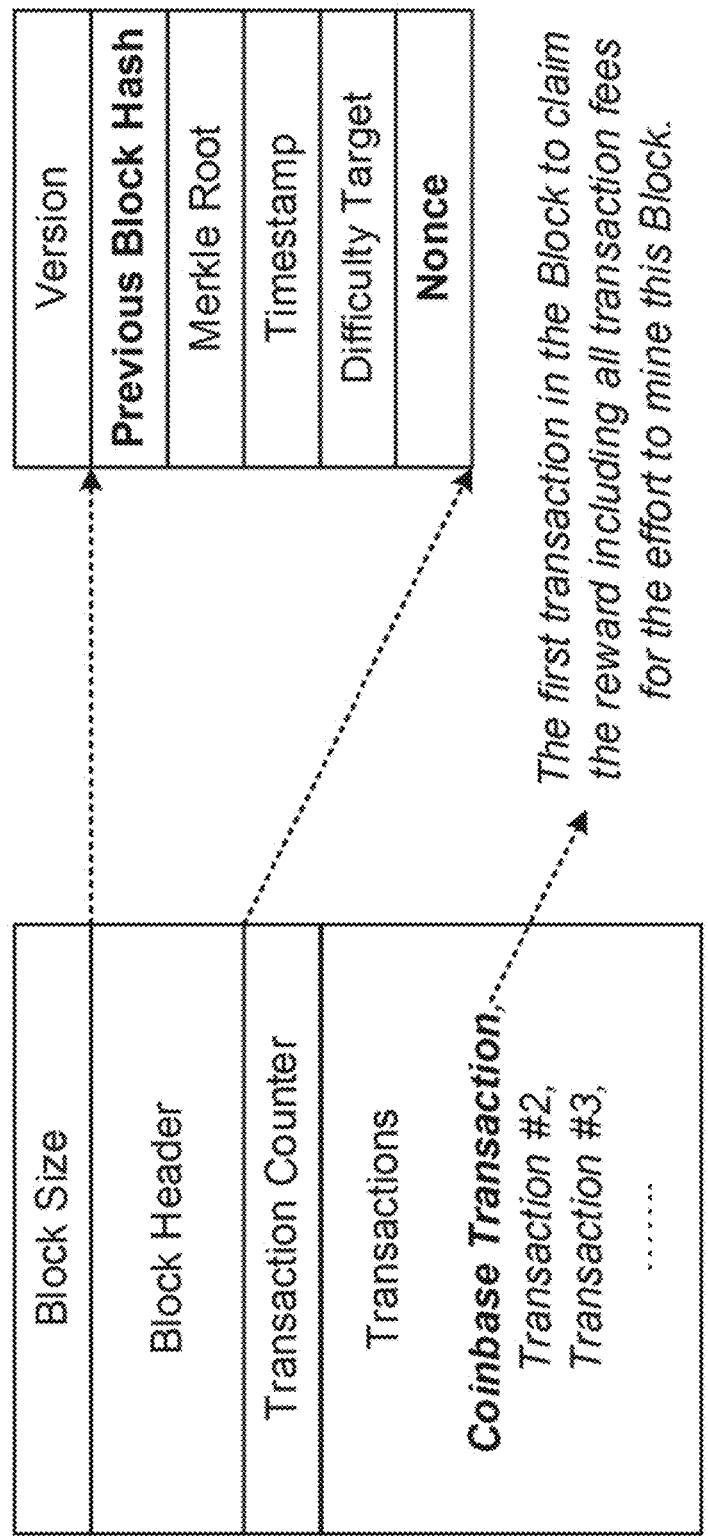
FIG. 5 shows a block diagram of an example distributed ledger structure in Bitcoin Systems.

At step 6.3, the DLN executes the consensus protocol and generates a new transaction set. Taking Bitcoin systems as an example, the DLN assembles unconfirmed transactions which have been buffered in the transaction pool into a block. The block may also contain a reference to the last block (e.g., hash (last block)) in the current ledger and a matching nonce. The matching nonce may be found after intensive computation attempts so that the hash of "this new block+the matching nonce" is smaller than a target value. Bitcoin systems have been designed such that this process (e.g., to find the matching nonce) will take ten minutes on average. In other words, the average time to take for generating new block by performing PoW protocol is ten minutes in Bitcoin systems. An example block structure used in Bitcoin systems is shown in FIG. 5.

At step 6.4, the DLN sends the new transaction set (e.g., a new block in Bitcoin system) to the P2P network.

Steps 7.1-7.4 may be triggered when the DLN receives a new transaction set from its neighboring DLN.

At step 7.1, the DLN receives a new transaction set from the P2P network. If the DLN is still executing the consensus protocol over the transactions contained in the received transaction set, and if the received transaction set is valid, the DLN may stop the present consensus protocol execution but may move to execute the consensus protocol over other unconfirmed transactions buffered in the transaction pool.

At step 7.2, the DLN validates the received transaction set according to the consensus protocol. Note that the consensus protocol (e.g., PoW in Bitcoin systems) may require intensive computation when generating a new transaction set (e.g., Step 6.3), but to validate a received transaction set is usually much quicker without too much computation.

At step 7.3, the DLN appends the transaction set to the ledger once it is a valid one. In general, this transaction set contains a reference to the last transaction set in the current ledger (e.g., its parent transaction set). In some DLSs, a validated transaction set, when it is appended onto the ledger, may be connected to multiple previous transactions sets. A general distributed ledger is shown in FIG. 4 and discussed below.

At step 7.4, the DLN forwards the validated transaction set to its neighboring DLNs.

Figure 4:
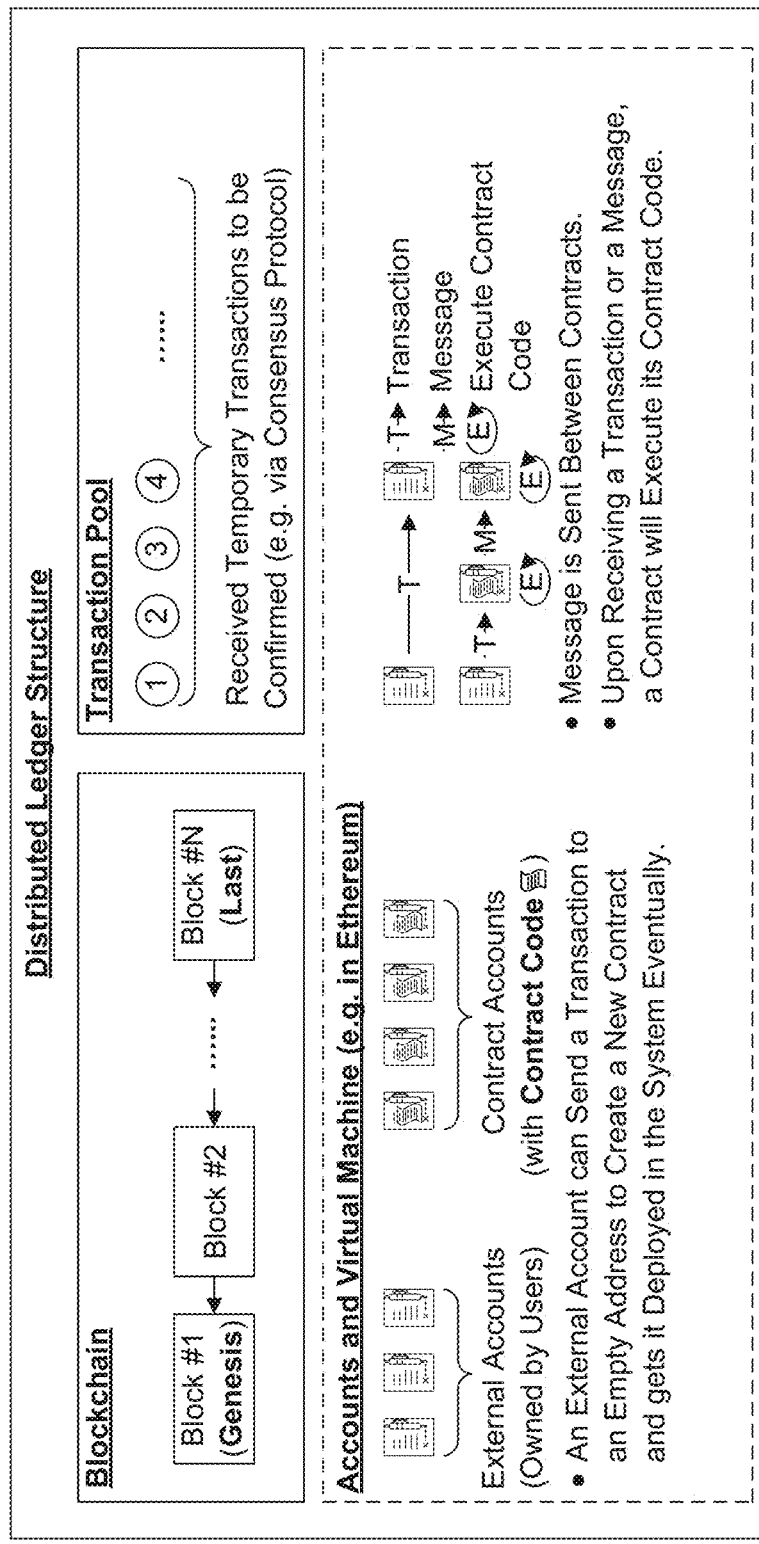
FIG. 4 shows a flow chart of an example distributed ledger structure in Bitcoin Systems and related distributed ledger systems.

FIG. 4 illustrates an example distributed ledger structure used in Bitcoin systems and other DLSs which use similar blockchain technology as Bitcoin systems. Note that a distributed ledger may be maintained by each full DLN node independently and may contain the following three components:

Blockchain: a chain of validated blocks. the first block is the genesis block without a reference to any previous block. Block #N is the last block which was generated and validated most recently;

Transaction Pool: a memory pool at a DLN to buffer all received but unconfirmed transactions. When a new block is received and validated, all contained transactions in the new block may be removed from the transaction pool; and Accounts and Virtual Machine: Bitcoin systems do not have this but Ethereum systems use this to support smart contracts and develop various vertical applications on top of Ethereum systems. There are two types of accounts in Ethereum systems: external accounts owned by users and contract accounts that contain contract code. An external account can send a transaction to an empty address to create a new contract (e.g., a contract account) and gets it deployed in the system eventually. The contract code is automatically triggered and executed whenever the contract account receives a transaction from an external account or a message from another contract account. Note that Ethereum systems use the same PoW protocol as Bitcoin systems for consensus purpose.

FIG. 5 shows an example block structure used in Bitcoin systems. The example block structure has the following fields:

Block Size: indicates the size of the whole block;

Block Header: contains information associated with the version, previous block hash, Merkle root, timestamp, difficulty target and nonce;

Version: the version of the Bitcoin system;

Previous Block Hash: the hash of the previous block (e.g., the last block on the ledger);

Merkle Root: a hash result of all contained transactions according to a certain tree structure;

Timestamp: the generation time of this block;

Difficulty Target: used to adjust the difficulty of POW protocol so that a new block may be generated every ten minutes on average;

Nonce: an integer obtained from running PoW protocol to guarantee that the hash (this block, nonce) will be smaller than a target value;

Transaction Counter: indicates the number of transactions contained in the block; and Transactions: contains a set of transactions. The first transaction is the coinbase transaction (or generation transaction) which is created by the miner (e.g., the DLN which generates this block) to claim the reward including all transaction fees for the effort to run the PoW protocol and generate this block. As a result, the coinbase transaction may not have an inputs part (see FIG. 6).

FIG. 6 shows the transaction structure in Bitcoin systems, where two specific transaction instances (e.g., TIDx and TIDy) are illustrated. The transaction instance TIDx may have been generated before the transaction instance TIDy.

Each transaction may have two major parts (e.g., "Inputs" and "Outputs") and some other fields not shown in the figure. The "inputs" part includes a list of Unspent Transaction Outputs (UTXOs), which other payers have transferred or paid to the issuer of this transaction. The "outputs" part includes a list of UTXOs which the issuer of this transaction will pay to use all UTXOs in "inputs" part. The total Bitcoin amount contained in the "inputs" part shall be no less than the total Bitcoins contained in "outputs" part, and the surplus may be paid as the incentive to the miner DLN which runs the PoW protocol and first generates a new and valid block.

In TIDx issued by User1, User1 makes payment to User2 and User4 (e.g., 0.1 bitcoin to User4 and 0.2 bitcoin to User2). Accordingly, there are two UTXOs in the "outputs" part of TIDx, one to User4 and the other to User2. Note that "inputs" part of TIDx is omitted for the convenience of illustration.

The "inputs" part of a transaction contains the reference of one or more UTXOs, which have been included in previous transactions. For example, the "inputs" part of TIDy contains one UTXO, which point to the UTXO with OutputIndex=1 in the transaction TIDx.

In TIDy issued by User2, User2 uses his bitcoins (e.g., received from User1 in TIDx) to make payment (e.g., 0.15 bitcoin) to User3; the 0.04 change is returned back to User2 and the rest 0.01 bitcoin is the transaction fee.

Each user may have a pair of unique keys (privateKey, publicKey). publicKey may be based on privateKey.

publicKey may be used to generate a unique Bitcoin address. The Bitcoin address is public and exposed to other users and may be used as the receiving address (e.g., the payee) in the "outputs" part of a transaction.

privateKey may be used to generate a signature, which may be used together with public key by the payer as UnlockingScript (US) to unlock a UTXO based on the LockingScript (LS) of the UTXO, and also by other DLNs to verify if the payer is the owner of this UTXO.

Figure 7:
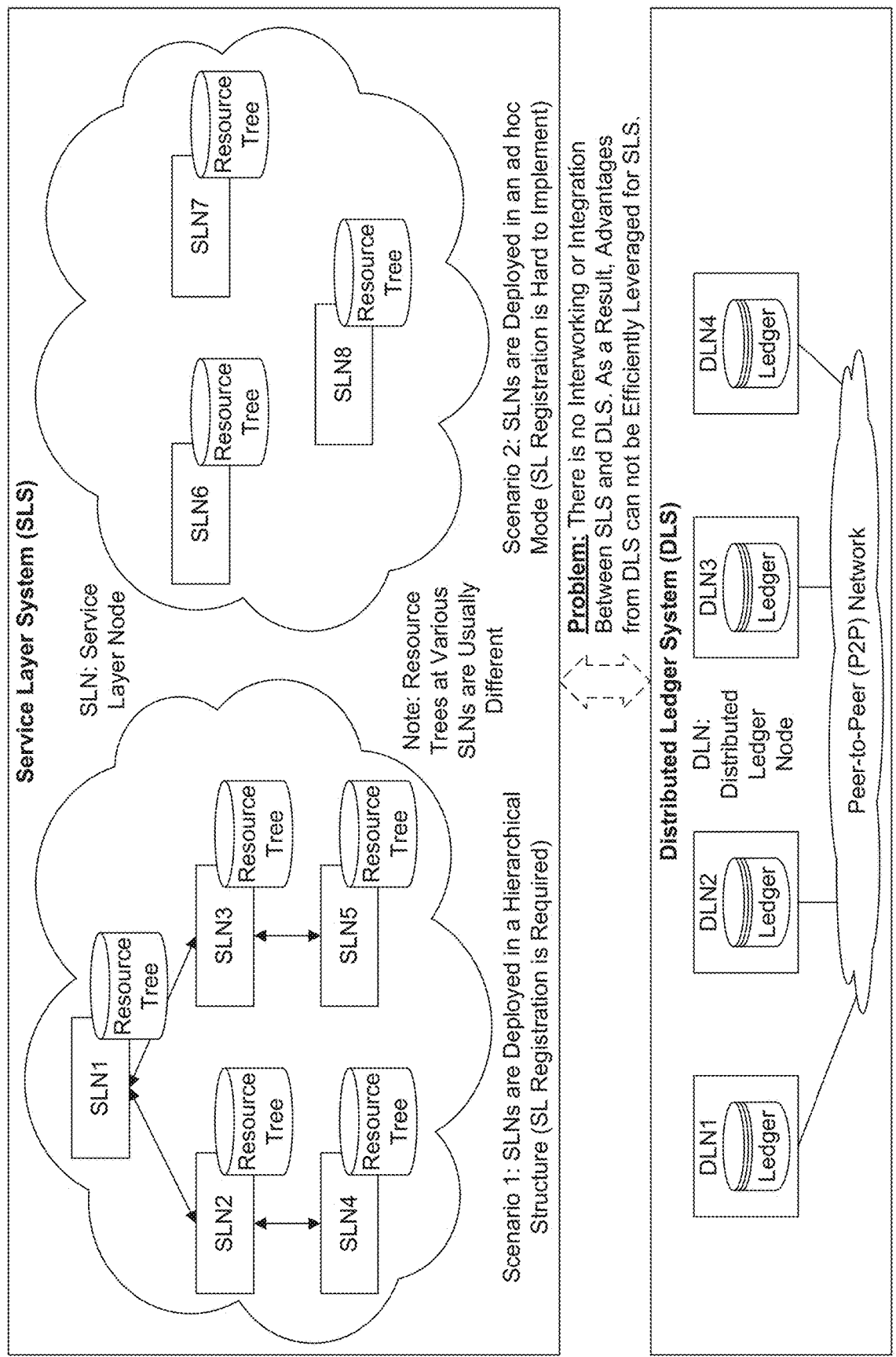
FIG. 7 shows a flow chart of separated IoT service layer systems and distributed layer systems.

As shown in FIG. 7, existing Internet of Things (IoT) Service Layer Systems (SLSs) may be used to maintain resources trees and to store data in different SLNs. For example, in oneM2M, an IN-CSE maintains a resource tree for IN-AEs, MN-CSEs, and ASN-CSEs, which register to the IN-CSE; and an MN-CSE hosts a resource tree for registered MN-AEs, ADN-AEs, and ASN-CSEs. However, the way existing SLSs store the data and manage the whole system inherits the following limitations:

A SLN is usually a centralized node for storing the data for all other SLNs which register to this SLN (e.g., Scenario 1 in FIG. 7). This centralized node may cause a single point of failure. In addition, the centralized node may be attacked with risks of denial of services, repudiation of access records, data falsification, etc.;

Each SLN may only maintain a portion of data for other registered SLNs. There is no guarantee that all data access histories and the data itself in the whole system will always be maintained;

In some scenarios where SLNs are deployed in an ad hoc manner such as for public safety and disaster management (e.g., Scenario 2 in FIG. 7), to pre-establish trust among those SLNs may not be feasible and the security in data exchange among them may be in danger; and Existing SLSs such as oneM2M need SLNs to establish registration relationships before they can communicate with each other. Such a SL registration processes may be a burden or hard to implement for some scenarios. For example, a SLN (e.g., a moving vehicle) may keep moving around and as such the existing SL registration will be repeatedly performed, which causes extra overhead. Again, for SLNs deployed in an ad hoc mode, SL registration may not be easily established. DLSs could be leveraged for these scenarios without the need for SL registration but while still guaranteeing security and trust for SLNs.

DLSs bring many advantages such as append-only, non-repudiable distributed ledgers without the need for pre-established trust. DLSs have good potential to overcome the limitations of SLSs as discussed above. However, existing SLSs and DLSs have been developed as two separate systems. Several issues may need to be addressed before SLSs can efficiently leverage the advantages of DLSs. For example: how the SLS can efficiently interwork with different but appropriate DLSs, how a SLN can properly indicate its capability and requirements in supporting/using DLSs, how the SLN can efficiently interact with DLNs for ledger-related operations, and how SLS information may be efficiently added (e.g., data access records) to distributed ledgers.

Methods and systems for interworking between IoT service layer systems and distributed ledger systems are disclosed herein.

A distributed ledger interworking architecture where a distributed ledger proxy interfaces with IoT service layer systems and distributed ledger systems is described. Service layer nodes may interact with a distributed ledger proxy to leverage functions provided by distributed ledger systems. For example, service layer nodes can request the distributed ledger proxy to insert some service layer information to distributed ledgers. A distributed ledger proxy can support multiple service layer nodes and may also interface to multiple different distributed ledger systems.

The following example methods for interworking an IoT service layer system and a distributed ledger system are disclosed herein:

A method for a service layer node to select an appropriate distributed ledger proxy for interworking with distributed ledger systems;

A method for a distributed ledger proxy to select an appropriate distributed ledger system for a service layer node;

A method for a distributed ledger proxy to associate with a service layer node, where the distributed ledger proxy may first register with the service layer node, the service layer node may request the approval for the distributed ledger proxy to use its proxying functions, and/or the distributed ledger proxy may send its transaction formats or templates to the service layer node;

A method for a service layer node to trigger adding service layer information to distributed ledgers;

A method for one service layer node to indicate distributed ledger requirements to another service layer node;

A method for a service layer node to assemble service layer information (e.g., a service layer request primitive) into transactions based on transaction formats received from the distributed ledger proxy. The service layer node may send the generated transactions to the distributed ledger proxy which may add them to distributed ledgers according to distributed ledger system specifications;

A method for a service layer node to simply send service layer information to a distributed ledger proxy, which may translate the service layer information to a transaction and add the transaction to distributed ledgers according to distributed ledger systems specifications;

A method for a service layer node to query and/or retrieve transactions from a distributed ledger proxy;

A method for a service layer node to verify a transaction status in distributed ledgers from a distributed ledger proxy; and A method for a service layer node to subscribe to transactions in distributed ledgers from a distributed ledger proxy.

It is understood that the methods and systems disclosed herein are not limited to the examples provided above.

In one embodiment, a distributed ledger proxy for interworking a service layer system and a distributed ledger system may be configured to receive from a service layer entity (e.g., a service layer node) a message comprising data to be stored at a distributed ledger node of the distributed ledger system, generate based on the data a transaction in accordance with one or more specifications of the distributed ledger system, send to the distributed ledger node information associated with the transaction, receive from the distributed ledger node an indication that the transaction has been confirmed by the distributed ledger node, and send to the service layer entity the indication that the transaction has been confirmed by the distributed ledger node. The distributed ledger system may comprise a plurality of distributed ledger nodes. The message may comprise an indication to store the data at a particular one of the distributed ledger nodes The distributed ledger proxy may be further configured to generate a mapping between the data received from the service layer entity (i.e., service layer node and/or service layer application entity) and the transaction. The indication that the transaction has been confirmed by the distributed ledger node may comprise at least one of an identifier of the transaction, an identifier of the data received from the service layer entity, and a hash of the data received from the service layer entity. The distributed ledger proxy may be further configured to send to the service layer entity and prior to receiving the indication that the transaction has been confirmed a response comprising an indication that the transaction is awaiting confirmation by the distributed ledger node. The distributed ledger proxy may be further configured to receive from the service layer entity another message comprising other data, wherein the transaction is generated based on the data and the other data.

The distributed ledger proxy may be further configured to receive from the service layer entity (i.e., service layer node and/or service layer application entity) a request to retrieve one or more transactions from the distributed ledger node, retrieve from the distributed ledger node information associated with the one or more transactions, and send to the service layer entity information associated with the one or more transactions. The distributed ledger proxy may be further configured to receive from the service layer entity a request to verify that one or more transactions have been confirmed by the distributed ledger node, send to the distributed ledger node a request to determine whether the one or more transactions have been confirmed by the distributed ledger node, receive from the distributed ledger node an indication that the one or more transactions have been confirmed by the distributed ledger node, and send to the service layer entity the indication that the one or more transactions have been confirmed by the distributed ledger node. The distributed ledger proxy may be further configured to receive from the service layer entity a request to receive automatic notifications about transactions at the distributed ledger node that meet certain notification criteria.

In another embodiment, the distributed ledger proxy may be further configured to receive from a service layer entity (i.e., service layer node and/or service layer application entity) a request to use one or more functions of the distributed ledger proxy for interworking with a distributed ledger node of the distributed ledger system, generate a public key and private key pair, create based at least on the public key an account associated with the service layer entity, and send to the service layer entity an indication that the account has been generated.

The distributed ledger proxy may be further configured to send to the service layer entity (i.e., service layer node and/or service layer application entity) a request to register with the service layer entity, the request comprising an indication of one or more distributed ledger nodes supported by the distributed ledger proxy, and receive from the service layer entity a response comprising one or more parameters, the one or more parameters comprising: an identifier of a distributed ledger node selected from the one or more distributed ledger nodes, one or more properties of a distributed ledger node that are desired by the service layer entity, and security and privacy requirements of the service layer entity. The request to use the one or more functions of the distributed ledger proxy may comprise information associated with one or more of the parameters. The one or more properties of a distributed ledger node may comprise one or more of: a type of the distributed ledger node, a consensus protocol associated with the distributed ledger node, a transaction fee associated with the distributed ledger node, a latency for adding a new transaction at the distributed ledger node, and a number of full distributed ledger nodes in the distributed ledger system. The service layer entity may maintain a list of distributed ledger proxies registered to the service layer entity. The distributed ledger proxy may be further configured to generate a mapping between an identifier of the service layer entity and one or more of the public key, the private key, and an identifier associated with the generated account. The first service layer entity may send some information (e.g., if the transaction has been successfully added to distributed ledgers, the identifier of the transaction, the service layer information and/or its identifier which has been included in the transaction, etc.) related to the added transaction to the second service layer entity.

In another embodiment, a first service layer entity may be configured to receive from a second service layer entity a message comprising data to be stored at a distributed ledger node of a distributed ledger system, determine based on the data a distributed ledger proxy for interworking between the first service layer entity and the distributed ledger node, send to the distributed ledger proxy the data to be added to the distributed ledger node, receive from the distributed ledger proxy an indication that the transaction has been generated, and store at the first service layer entity information associated with the transaction. The distributed ledger proxy may be configured to generate, based on the data, a transaction in accordance with one or more specifications of the distributed ledger system.

The distributed ledger proxy may be configured to generate a mapping between the transaction and information associated with the first service layer entity. The first service layer entity may be further configured to store the mapping between the transaction and the information associated with the first service layer entity. The message may comprise an indication of which service layer entity is to send the information to the distributed ledger proxy. The information may comprise an indication of when the data should be added to the distributed ledger node. The transaction may comprise an identifier of the first service layer entity.

The following terminology is provided for context in describing the methods for interworking between IoT service layer systems and distributed ledger systems.

Distributed Ledger: a distributed append-only database that is maintained by and at different Distributed Ledger Nodes (DLNs). The ledger maintained at each DLN is identical. The ledger basically contains transactions which are grouped together in various structures (e.g., Blockchain in Bitcoin systems).

Distributed Ledger System: the system that consists of DLNs working together but in a distributed way to create and maintain distributed ledgers. In general, those DLNs are connected and communicate with each other over an underlying Peer-to-Peer (P2P) network. For example, the Bitcoin system is a Distributed Ledger System (DLS).

Distributed Ledger Node: a logical node where a ledger is created and maintained. A DLN has several other DLNs as its peers. Each DLN can generate new messages to its peer DLNs and may also forward any received messages to its peer DLNs (except the one where the message was received from) according to underlying P2P network protocols. There is no assumption that DLNs trust each other. A DLN could be a "full DLN" (e.g., one where a complete ledger is maintained) or a "light DLN" (e.g., one that does not maintain a complete ledger).

Transaction: the minimum message unit being transmitted among DLNs in a DLS (also referred to as DLS Transaction). A DLN (e.g., a payer in Bitcoin systems) can issue a transaction to another DLN (e.g., a payee in Bitcoin systems). Each issued transaction may be sent to and forwarded by the issuer's peer DLNs based on underlying P2P protocols and eventually it will be received by all DLNs in the DLS. Since DLNs work in a distributed way, they may need to reach a consensus on all transactions sent over the DLS before they are validated and stored in distributed ledgers (e.g., via certain consensus protocols). The status of a transaction could be generated by a DLN, sent to the DLS (or received by DLNs from the DLS), and/or appended to distributed ledgers and confirmed by the DLS (e.g., after running the consensus protocol at each participating DLN).

Transaction Set: a structure which groups several transactions together (e.g., a Block in Bitcoin systems). In some DLSs, consensus protocols are executed over each transaction set instead of a single transaction to improve efficiency.

Consensus Protocol: the protocol used by DLNs to reach consensus on all transactions sent over the DLS before they are validated and stored in distributed ledgers. An example of a consensus protocol is Proof-of-Work (PoW) used in Bitcoin systems and other DLSs built on top of Bitcoin systems.

Distributed Ledger Proxy: a logical node which may interface with both SLSs and DLSs. A Distributed Ledger Proxy (DLP) basically supports both service layer functions and distributed ledger functions. It could be a combination of a SLN and a full DLN.

Four distributed ledger interworking architecture options are described herein in connection with FIGS. 8, 9, 10 and 11. Based on these interworking architecture options, overall interworking procedures are briefly illustrated in FIGS. 12, 13 and 14. Then, detailed procedures are presented in separate diagrams, for example, FIG. 15 for DLP and SLN association, FIGS. 16, 17 and 18 for adding service layer information to distributed ledgers, FIG. 20 for querying/retrieving transactions from distributed ledgers, FIG. 21 for verifying a transaction status in a distributed ledger, and FIG. 22 for subscribing to transactions in distributed ledgers.

Described herein are four example distributed ledger interworking options.

A DLP is proposed as a new logical node between SLSs and DLSs to interwork them together. A DLP has an interface to SLSs as an SLN, and another interface to DLSs as a DLN. The DLP can support multiple different DLSs and accordingly it can select an appropriate DLS for an SLN or an SLS. The DLP can register to an SLN and can send the transaction format to the SLN. The SLN may need to request the approval from the DLP before using it for storing transactions in the DLS. As a part of this request, the DLP may create a DLS account for the SLN if the DLP approves the request. The DLP receives requests from the SLN and in turn performs various tasks as requested by the SLN. In the meantime, an SLN can connect to multiple DLPs and may select an appropriate DLP for different SL information. The unique identifier of the SLN at the SL can be reused in the SLS as the issuer or recipient identifier of a transaction.

Figure 8:
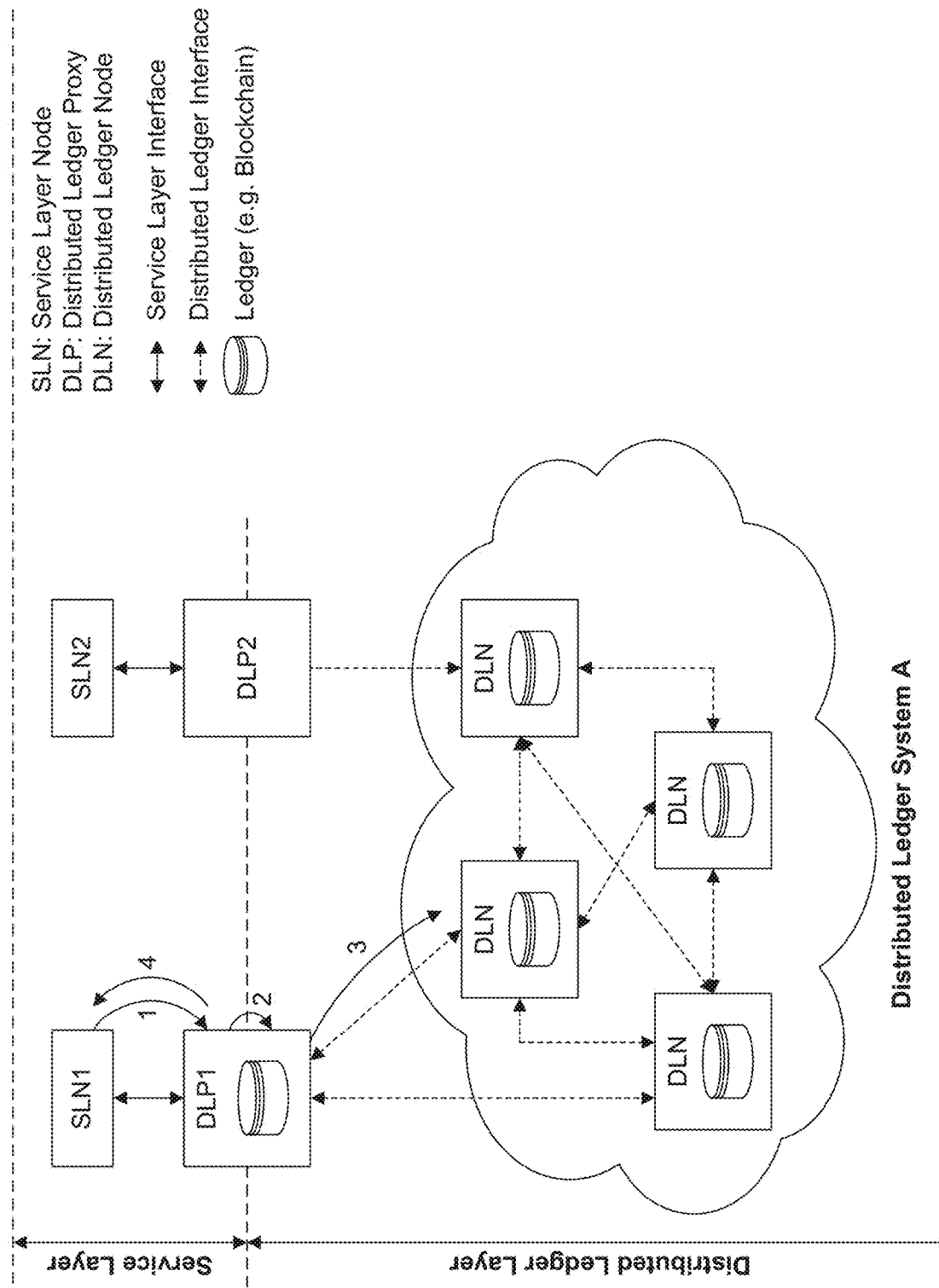
FIG. 8 shows a first example distributed ledger interworking architecture.

FIG. 8 illustrates an interworking architecture Option 1 for SLSs to leverage DLSs. The SLS may leverage the DLS to store many types of service layer information and/or its digest (e.g., service layer request/response history, service layer subscription notification records, service layer registration history, service layer resource history, service layer data access records, etc.). The Service Layer (SL) sits on top of Distributed Ledger Layer (DLL). A Distributed Ledger Proxy (DLP) is proposed as an interworking function entity to connect the service layer and the distributed ledger layer together. The DLP has two interfaces: service layer interface to a Service Layer Node (SLN) and distributed ledger interface to DLNs. In this interworking option, each SLN connects to a different DLP so that the SLN identifier or its variants (e.g., hash (SLN identifier)) can be directly used in the underlying DLS. The DLP could be a full DLN node with a ledger maintained or a light DLN node without a ledger maintained.

When a SLN needs to leverage a DLS (e.g., the SLN receives and approves a new SL registration and it wants to store this SL registration to the DLS and distributed ledgers), the following operations may be performed at the SLN and a corresponding DLP:

At phase 1, the SLN first needs to find an appropriate DLP and connect to it; then the SLN sends an SL message (which contains service layer information to be stored in distributed ledgers) or a DLS transaction to the DLP.

At phase 2, at the DLP, one or more SL messages from the SLN will be translated into a DLS transaction according to DLS specifications, unless what the SLN sent to the DLP in step 1 is a DLS transaction. One approach is to simply contain those original SL messages in the body of DLS transactions. Optionally, the DLP may first compress those original SL messages, for instance, by removing any redundant information or parameters in the SL messages. Note that one SL message from the SLN could trigger the DLP to generate a new DLS transaction; alternatively, the DLP may buffer several SL messages and contain them in one DLS transaction. The DLP may keep the mapping between the DLS transaction and original SL messages or between the DLS transaction and a hash of original SL messages.

At phase 3, the DLP like a normal DLN sends the generated DLS transactions to the DLS. At this moment, the DLP may send a quick response to the SLN to inform it that several SL messages have been assembled into a DLS transaction and the DLS transaction has been inserted to the DLS but it is waiting for confirmation. This response message may contain the identifier of the DLS transaction, identifiers of SL messages contained in the DLS transaction, and other metadata about the DLS transactions.

At phase 4, after the DLS transaction is confirmed within the DLS and appended onto the ledger, the DLP may send another SL response or notification back to the SLN. This SL response may contain the identifier of the DLS transaction, the identifier of original SL messages that has been translated to the DLS transaction, the hash of original SL messages which has been translated to the DLS transaction, etc.

Figure 9:
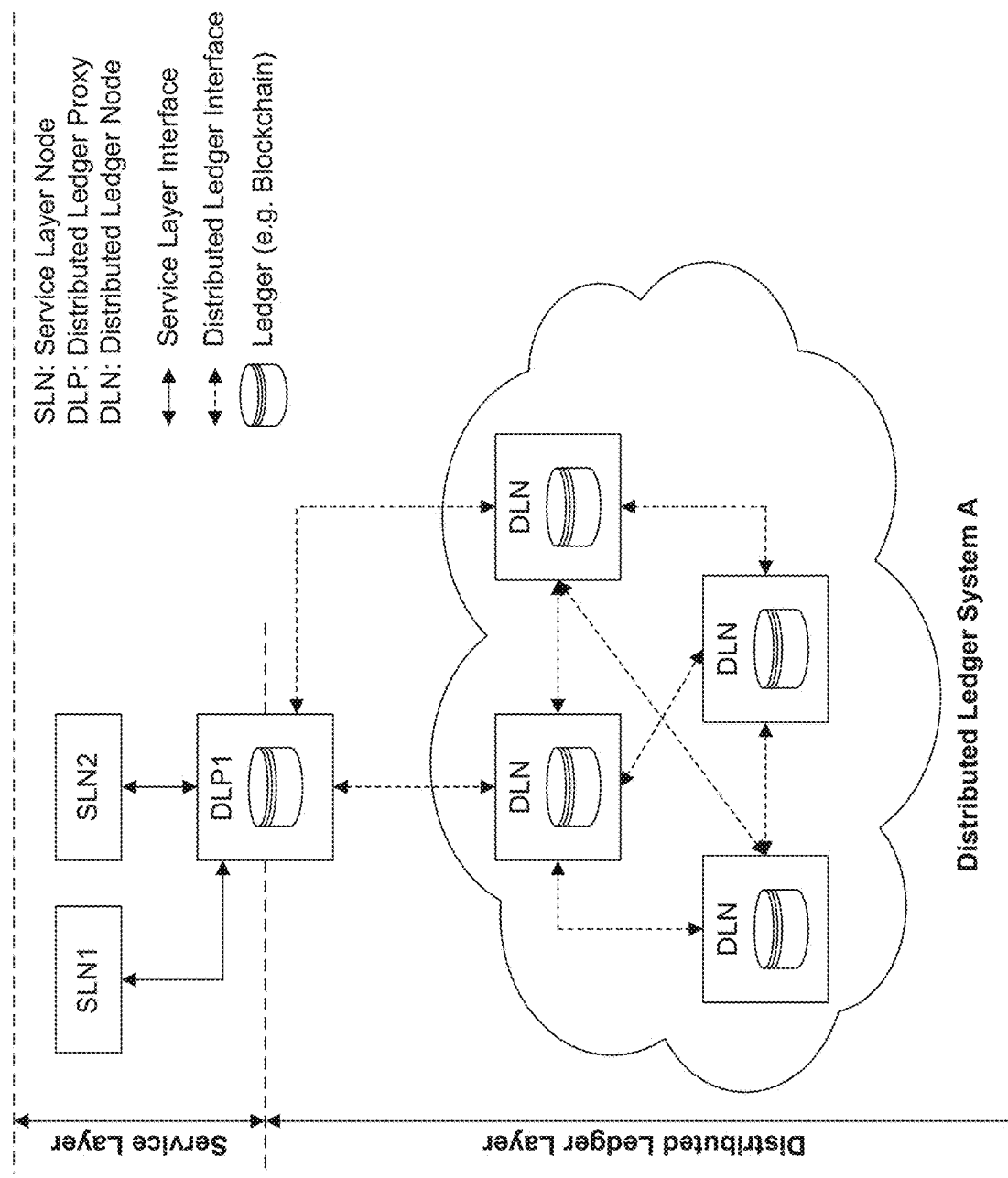
FIG. 9 shows a second example distributed ledger interworking architecture.

FIG. 9 illustrates an alternative interworking architecture Option 2 for SLSs to leverage DLSs. The difference from Option 1 is that DLP1 in Option 2 can support multiple SLNs. In this case, DLP1 can still use the unique identifier of the SLNs (e.g., SLN1 or SLN2) as the issuer of each DLS transaction to be generated at the DLP1 and accordingly DLP1 may need to manage multiple DLS users or accounts (one for each SLN). Alternatively, DLP1 can use its own identifier as the issuer of each DLS transaction and may only need to manage one DLS account. However, DLP1 may need to add the identifier of each SLN into the generated transaction or maintain a separate mapping between the identifier of each DLS transaction and the identifier of corresponding SLN that has issued the SL messages as contained in the DLS transaction.

Figure 10:
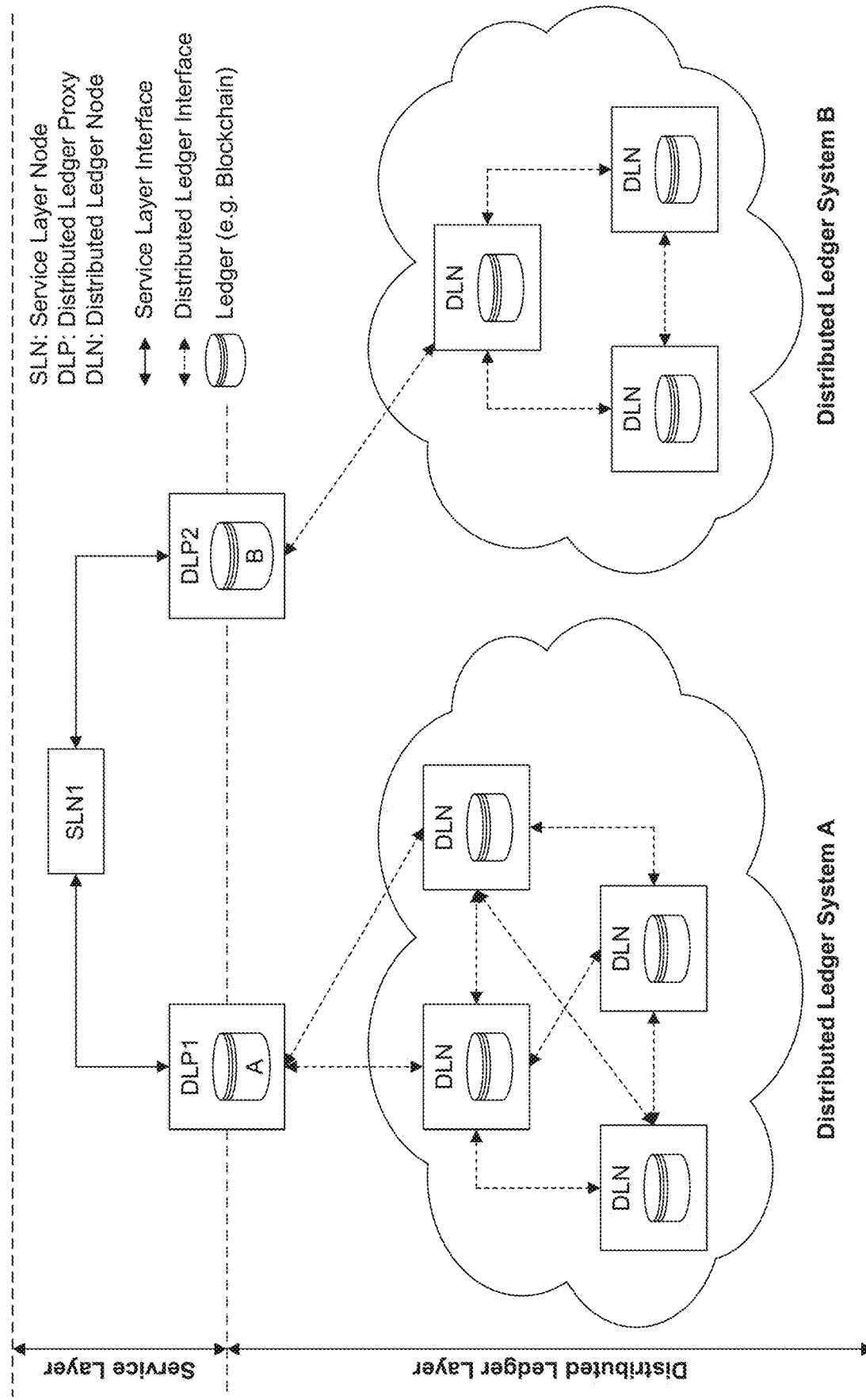
FIG. 10 shows a third example distributed ledger interworking architecture.

FIG. 10 illustrates another alternative interworking architecture Option 3 for SLSs to leverage DLSs. The difference from Option 1 is that a SLN in Option 3 can connect to multiple DLPs but each DLP may still only support one type of SLS (e.g. oneM2M, Open Connectivity Foundation, World Wide Web Consortium Web of Things, etc.) like Option 1. Since various DLPs may support different types of DLSs (e.g., public ledger, private ledger, etc.) and each DLS may use different consensus protocols and transaction semantics, the SLN can choose the most appropriate DLP based on its need. For example, some highly sensitive data access records can be stored in a private ledger (e.g., DLS A in the figure) while less sensitive service layer request history can be stored in a public ledger (e.g., DLS B in the figure).

Figure 11:
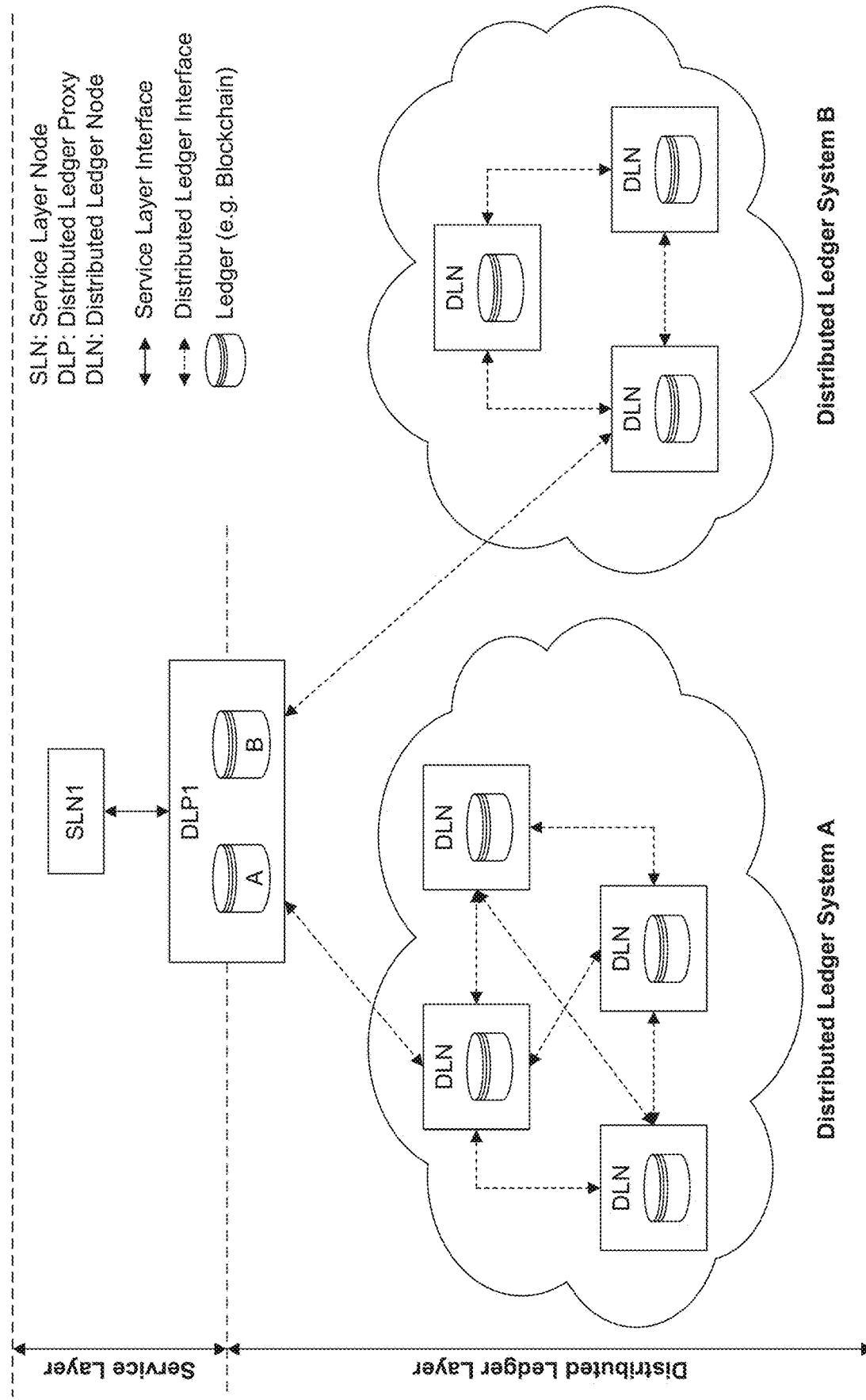
FIG. 11 shows a fourth example distributed ledger interworking architecture.

FIG. 11 illustrates interworking architecture Option 4 for SLSs to leverage DLSs, where one single DLP can connect to and support multiple types of DLSs. In other words, the DLP maintains multiple ledgers and each ledger corresponds to different DLSs. For this scenario, SLNs may perform the same way as in Option 1, but the DLP may need to select the most appropriate DLS for a SLN which connects to the DLP. The selected DLS may be transparent to the SLN. Alternatively, the DLP can inform the SLN of the types of DLSs it supports; then, the SLN itself can choose the appropriate DLS (similar to Option 3).

Procedures for distributed ledger interworking are disclosed herein.

The interworking between a SLS and a DLS mainly focuses on how a SLN can leverage functions (e.g., building append-only, non-repudiable and non-tamperable distributed databases) provided by the DLS. This is achieved by proposing new interactions between a SLN and a DLP, such as DLP and SLN association, adding SL information to distributed ledgers, querying/retrieving transactions in distributed ledgers, verifying transaction status in distributed ledgers, and subscribing to transactions in distributed ledgers.

Figure 12:
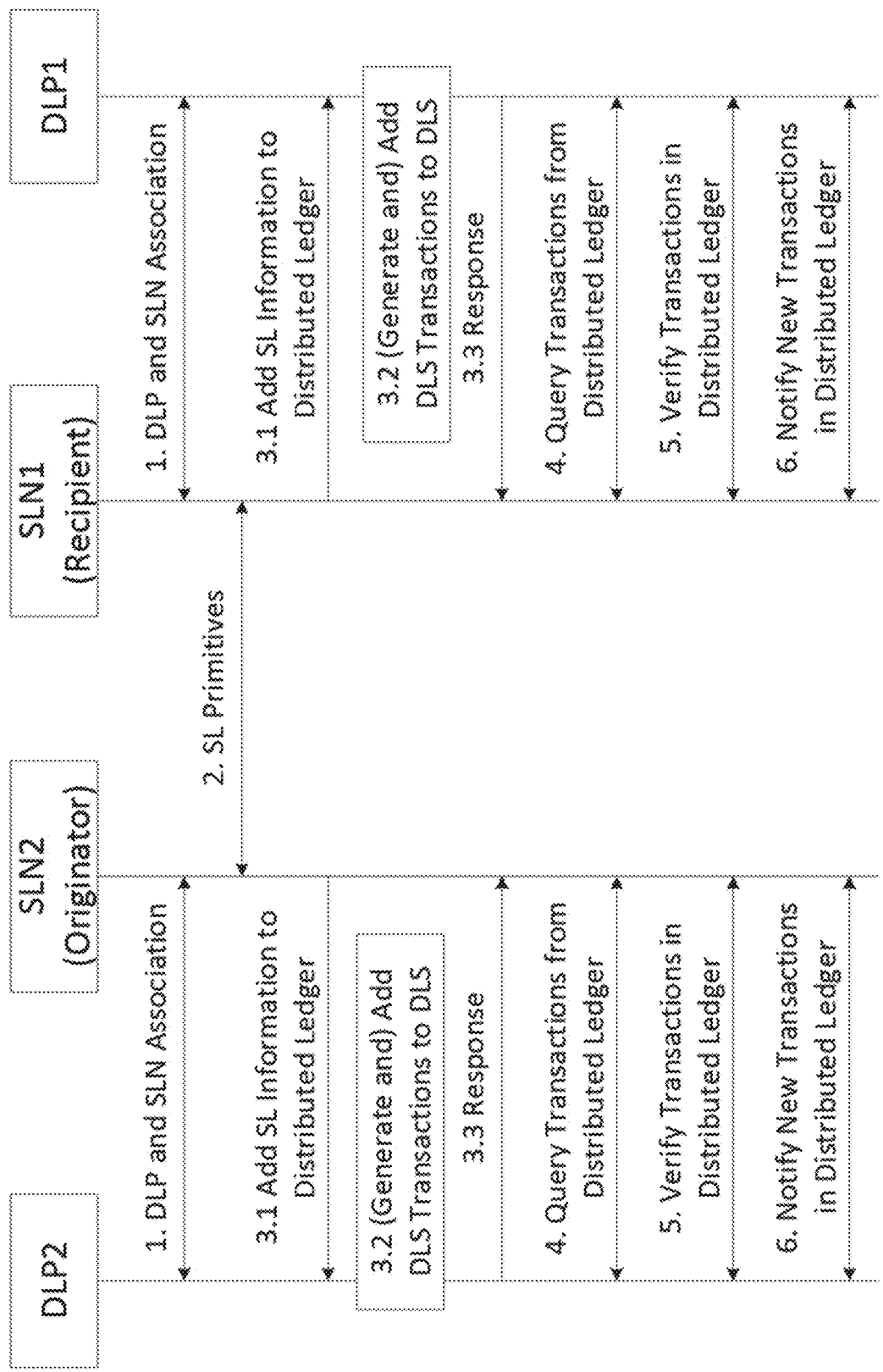
FIG. 12 shows a flow chart of an example method for distributed ledger interworking using the first and second interworking architectures.

FIG. 12 illustrates an example overall procedure for SLNs to add SL information to distributed ledgers, after they have SL interactions. The procedures shown in this figure are applicable to interworking Option 1 and Option 2 and details will be discussed in other figures. Either an originator SLN or a recipient SLN can interact with its DLP to store SL information to distributed ledgers. For the convenience of description, SLN1 and DLP1 are used in the following description, which can be directly applied for SLN2 and DLP2.

At step 1, SLN1 and DLP1 are associated with each other. As a part of this step, DLP1 may first register with SLN1; alternatively, DLP1 may register itself to a third-party repository (e.g., a DNS-SD sever) and SLN1 can discover DLP1 from the third-party repository. Then, SLN1 may request the approval from DLP1 for leveraging its functions to interwork with the DLS.

At step 2, SLN1 and SLN2 exchange existing SL primitives as usual.

At step 3, after the SL interaction between SLN1 and SLN2 in step 2 is completed, either SLN1 or SLN2 may be triggered to leverage the DLS to store some SL information about step 2 or any previous SL interactions.

At step 3.1, SLN1 sends a message to DLP1. This message may contain SL information to be stored in the DLS. Alternatively, SLN1 can directly generate a DLS transaction and send it to DLP1 if it knows the format of DLS transactions, which can be sent from DLP1 to SLN1 in step 1.

At step 3.2, if DLP1 receives a DLS transaction at Step 3.1, it may simply forward the DLS transaction to its peer DLNs. Otherwise, DLP1 buffers the received SL information and generates a DLS transaction immediately or at a later time.

At step 3.3, after the DLS transaction is added to the DLS (and optionally validated by peer DLNs), DLP1 sends a response back to SLN1.

At step 4, SLN1 can query and retrieve any DLS transactions which have been previously added to the DLS via DLP1.

At step 5, SLN1 can verify if a piece of SL information or a DLS transaction has been successfully added to and validated by the DLS.

At step 6, SLN1 can make a subscription to DLP1 for receiving automatic notifications about new DLS transactions which are received from the DLS and meet certain notification criteria.

Figure 13:
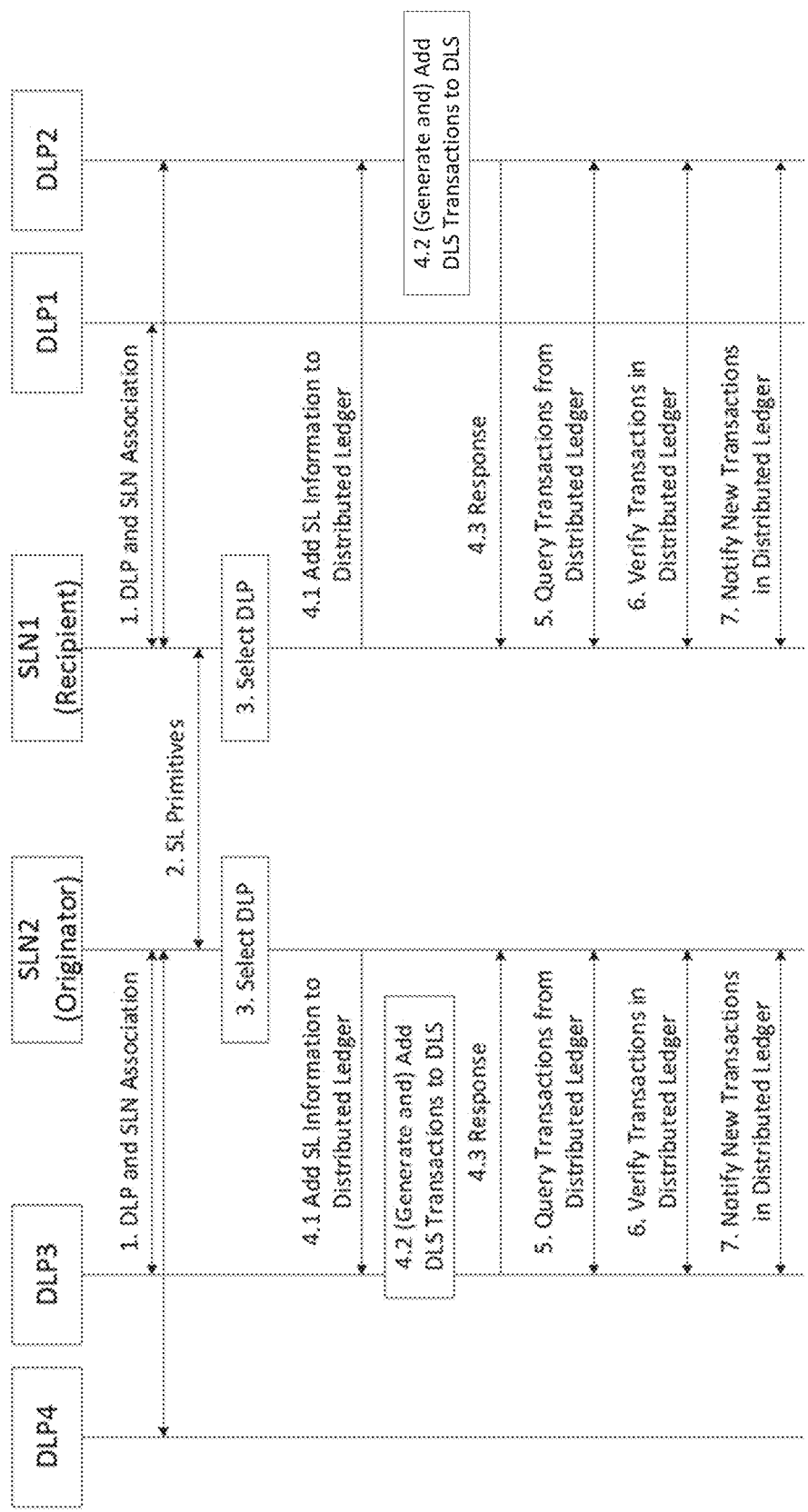
FIG. 13 shows a flow chart of an example method for distributed ledger interworking using the third interworking architecture.

FIG. 13 illustrates example overall procedures for SLNs to add SL information to distributed ledgers. The procedures shown in this figure are applicable to interworking architecture Option 3 and details will be discussed in other figures. Note that FIG. 13 is similar to FIG. 12 with the exception of step 3:

At step 3, the scenario in interworking architecture Option 3, SLN1 (or SLN2) connects to or associates with multiple DLPs (e.g., DLP1 and DLP2). Before SLN1 sends SL information (or generates a DLS transaction) to a DLP, it first needs to select an appropriate DLP. The selection criteria could be based on: the type of SL information to be added to the DLS, the originator (or the recipient) involved in the SL information to be added to the DLS, the security and/or privacy requirement level, the latency requirement about adding a DLS transaction to the DLS, the current time, the current location, the required transaction fee for different DLS, and/or other context information about the SLN1 or the DLS.

Figure 14:
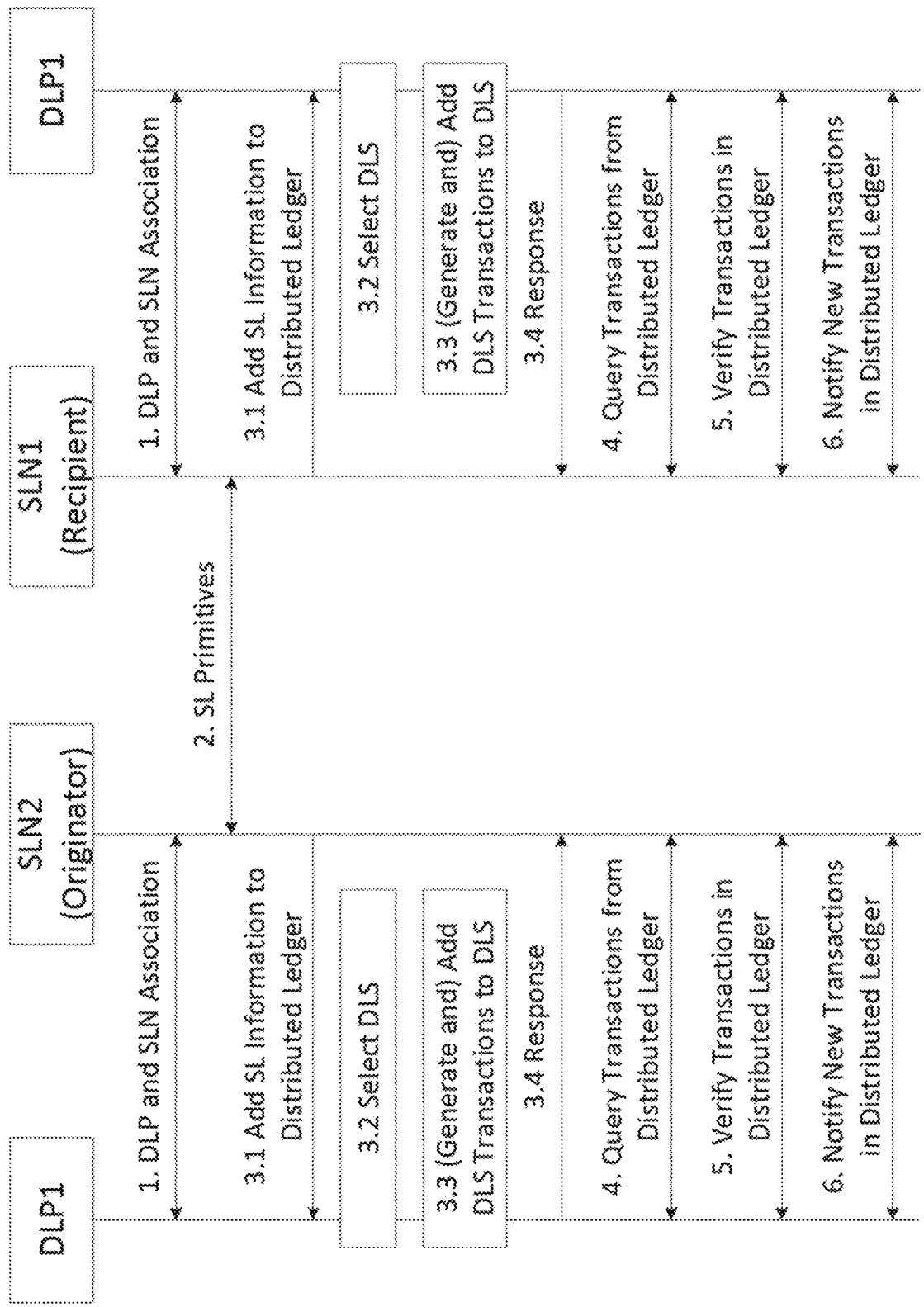
FIG. 14 shows a flow chart of an example method for distributed ledger interworking using the fourth interworking architecture.

FIG. 14 illustrates example overall procedures for SLNs to add SL information to distributed ledgers. The procedures shown in this figure are applicable to interworking architecture Option 4 and details will be discussed in other figures. Note that FIG. 14 is similar to FIG. 12 with the exception of step 3.2:

At step 3.2, for the scenario in interworking architecture Option 4, DLP1 maintains multiple distributed ledgers, each for a different DLS. The request from SLN1 for adding SL information to distributed ledgers may not indicate a target DLS. As a result, DLP1 may need to select an appropriate DLS for SLN1. The selection criteria could be based on: some hints (e.g., the type of target DLSs) from SLN1 which could be conveyed in Step 3.1, the type of SL information to be added to the DLS, the security and/or privacy requirement level from SLN1, the latency of the DLS for adding a DLS transaction, and/or other context information about the SLN1 or the DLS. Note that the DLP communicating with SLN2 in FIG. 14 could be another DLP2.

Methods and systems for DLP and SLN association are disclosed herein.

A DLP can register itself to a SLN and accordingly the SLN may maintain a list of registered DLPs. This list can be searched and retrieved by other SLNs to look up appropriate DLPs for their use. Before leveraging functions (e.g., building append-only, non-repudiable and non-tamperable distributed databases) provided by a DLP, the SLN may need to request the approval from the DLP; during this process, the SLN can inform the DLP of any targeted DLS and the DLP can send the designated transaction format to the SLN. In addition, the DLP can create a DLS account for the SLN.

Figure 15:
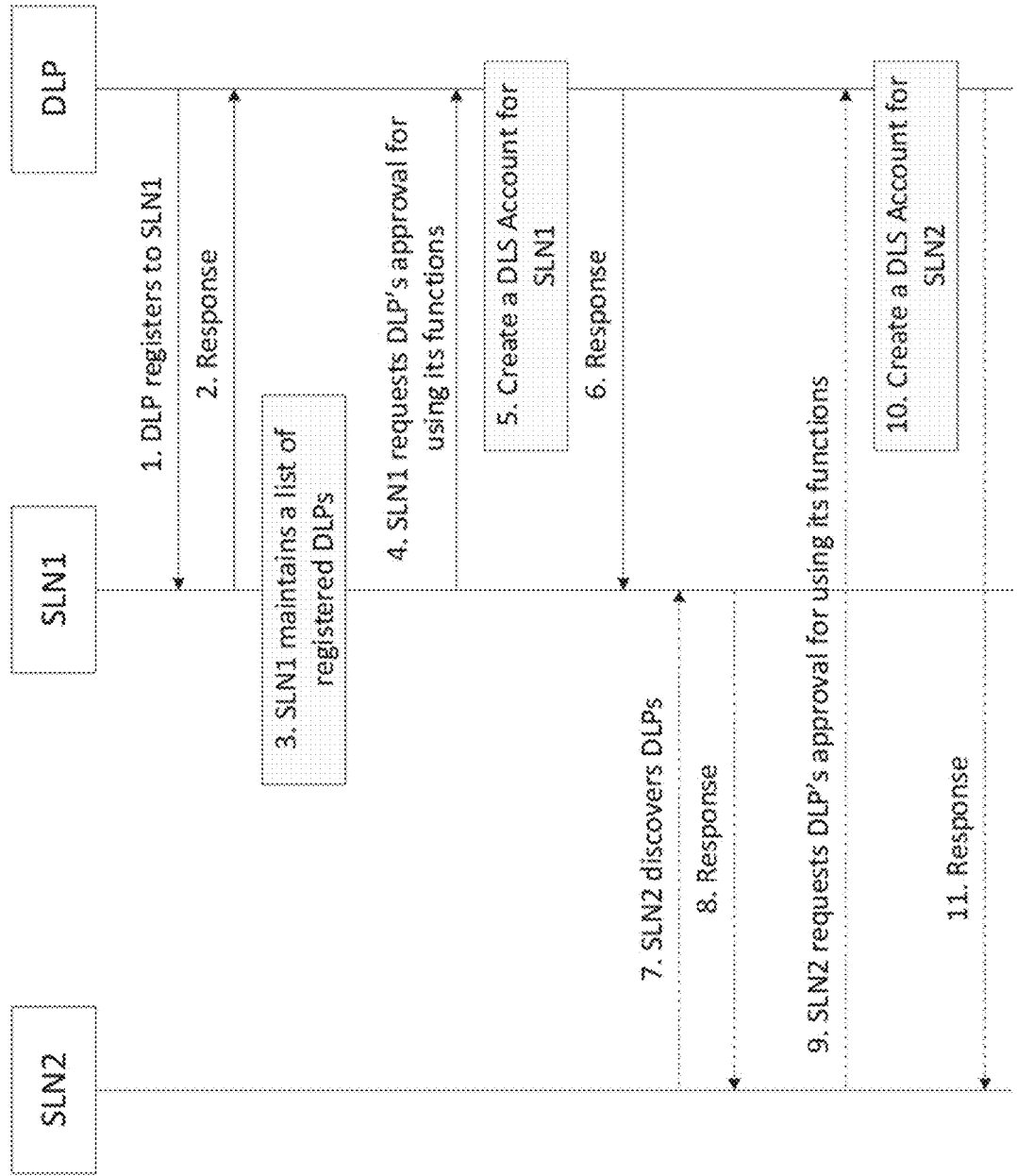
FIG. 15 shows a flow chart of an example method for a distributed ledger proxy and service layer node association.

FIG. 15 illustrates example procedures for DLP and SLN association, and is described in detail below:

At step 1, the DLP registers to SLN1. DLP may inform SLN1 of the following information:

The list of DLSs (including their properties) that the DLP supports. The properties of a DLS could be, for example: a name or identifier for the DLS, its type (e.g., private, public), the consensus protocol (e.g., PoW), the transaction fee, the latency for adding a new transaction, the number of full DLN nodes in the DLS, etc.; and/or The identifier (e.g., account address or the public key) of the DLP as a DLN in each DLS.

At step 2, SLN1 sends a response to the DLP. SLN1 may inform the DLP of the following information:

targetDLS: the target DLS ID that is selected from the list of DLSs sent in step 1;

expectedDLSProperties: the expected properties of target DLS if DLP did not send a list of DLSs in step 1; and spRequirement: The security and privacy requirements from the SLN1.

At step 3, SLN1 maintains a list of registered DLPs and potentially a list of corresponding DLSs if they were provided by DLP in step 1.

At step 4, SLN1 requests the DLP's approval for using its functions to interwork with a DLS. The message may contain the following information (e.g., if not contained in step 2):

targetDLS: the target DLS ID that is selected from the list of DLSs sent in step 1;

expectedDLSProperties: the expected properties of target DLS if DLP did not sent a list of DLSs in step 1; and spRequirement: the security and privacy requirements from the SLN1.

At step 5, a DLS Account may be created for SLN1. The DLP may first generate a pair of private key and public key for SLN1. Alternatively, the public-private keys may be obtained through a third-party certification authority used to distribute security keys. Then, DLP may create a DLS account for SLN1. The identifier of the DLS account (e.g., dlsAccountID) may be the generated public key or its hash. The DLP may maintain a mapping table between SLN1's SL identifier and the generated private key, public key, and dlsAccountID for SLN1 (e.g., the second row in Table 1). With this mapping, DLP may be able to find any SLN's dlsAccountID (and its private/public keys) based on the SLN's identifier, which could be given by any other SLNs.

At step 6, the DLP sends a response to SLN1. This message may contain the following information:

targetDLS: the target DLS ID which is selected and/or confirmed for SLN1;

txFormat: the transaction format (e.g., transaction template) to be used for the target DLS;

maxTxRate: the maximum transaction generation rate which is allowed for SLN1;

slnPubicKey: the public key generated at step 5 for SLN1;

slnPrivateKey: the private key generated at step 5 for SLN1. If there is no secure communication between SLN1 and DLP, this parameter will not be included in step 6; and dlsAccountID: the identifier of the DLS account generated at step 5 for SLN1.

At step 7, SLN2 discovers DLPs from SLN1. The discovery criteria from SLN2 may comprise the type of supported DLSs, the type of consensus protocols, etc. SLN1 searches the list of registered DLPs as created and maintained in step 3.

At step 8, SLN1 sends a response to SLN2. The response may contain a list of discovered DLPs including their address and optionally other information (e.g., the list DLSs that each discovered DLP supports).

Step 9 may be similar to step 4.
Step 10 may be similar to step 5.
Step 11 may be similar to step 6.

TABLE 1

DLS Accounts for SLNs

| SLN SL Identifier | Private Key (Generated at DLP) | Public Key (Generated at DLP) | DLS Account ID (=Hash (Public Key)) |
| --- | --- | --- | --- |
| SLN1 | privateKey1 | publicKey1 | Hash (publicKey1) |
| SLN2 | privateKey2 | publicKey2 | Hash (publicKey2) |
| ... | ... | ... | ... |

Methods and systems for adding service layer information to distributed ledgers are disclosed herein.

A SLN as an originator or a recipient can send SL information (e.g., a service layer request primitive) to a DLP, which may translate the SL information to a DLS transaction and add the DLS transaction to distributed ledgers according to DLS specifications. The DLP may maintain the mapping between the SL information and the corresponding DLS transaction and may send this mapping to the SLN. Additionally or alternatively, the SLN can assemble SL information into DLS transactions based on the transaction format received from the DLP. The SLN may then send the generated transaction to the DLP which may add it to distributed ledgers according to DLS specifications.

Figure 16:
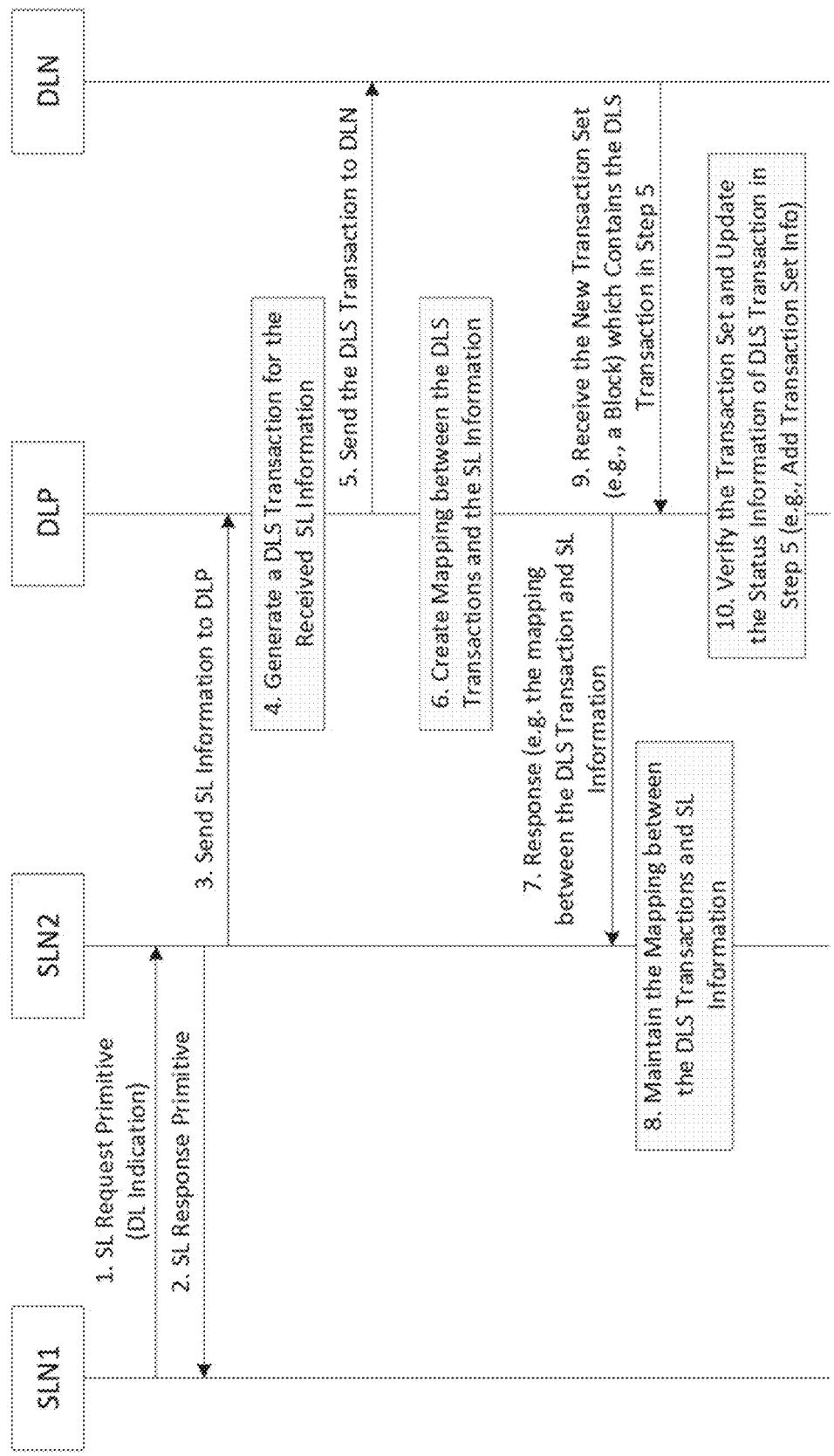
FIG. 16 shows a flow chart of a first example method for adding service layer information to distributed layers.

FIG. 16 illustrates example procedures for a SLN to add SL information to a DLS. In this scenario, SLN1 and SLN2 exchange SL primitives. SLN2 may then decide to send some SL information to DLP. DLP may translate the received SL information to a DLS transaction and add it to the DLS. Note that SLN1 and SLN2 may not have any established trust or registration, for instance, if both are deployed in an ad hoc mode or both belong to a different service provider. By leveraging this procedure to store their exchanged SL information to distributed ledgers, neither can deny nor falsify previous interactions between them.

At step 1, SLN1 sends a SL request primitive to SLN2. A "DL Indication" may be contained in this request to instruct SLN2 to add the request primitive (and/or the response message in step 2) to a DLS. As an example, the "DL Indication" may include the following parameters:

dlAction: indicate if SLN1 or SLN2 needs to trigger adding SL information to a DLS. For example:
dlAction=0: neither SLN1 or SLN2 needs to leverage the DLS. In this case, other parameters may not be needed.
dlAction=1: SLN1 is responsible for leveraging the DLS. In this case, targetDLP and typeOfTargetDLS may not be needed for step 1.
dlAction=2: SLN2 is responsible for leveraging the DLS.
dlScope: indicate which SL information is to be added to the DLS. For example,
dlScope=1: add the entire request primitive to the DLS.
dlScope=2: add the entire response primitive to the DLS.
dlScope=3: add both request and response primitive to the DLS.
dlScope=4: add the header of request primitive to the DLS.
dlScope=5: add the header of response primitive to the DLS.
dlScope=6: add headers of both request and response primitive to the DLS.
dlScope=7: add the next request primitive from SLN2 to another SLN as indicated by dlScopeNode to the DLS.
dlScope=8: add the next request primitive from another SLN as indicated by dlScopeNode to SLN2 to the DLS.
dlScopeNode: indicates another SLN.
dlsAccountID: the DLSaccount ID of SLN1.
targetDLP: indicate the address of target DLP. If this parameter is included, typeOfTargetDLS may not be required.
typeOfTargetDLS: indicate the type of target DLSs that SLN1 requires or prefers SLN2 to leverage. SLN2 can select an appropriate DLP based on this parameter.

At step 2, SLN2 receives the SL request primitive and processes the contained "DL Indication". If dlAction=2, SLN2 may determine the final targetDLP (e.g., according to typeOfTargetDLS contained in step 1). SLN2 generates a SL response primitive and sends it to SLN1. The response primitive may contain the final targetDLP and dlScope that SLN2 selects, the hash of SL information to be contained in the DLS transaction, and SLN2's dlsAccountID. Alternatively, SLN2 may send this response primitive to SLN1 after step 8 if dlAction is not equal to 1. In this case, the identifier of the corresponding DLS transaction (if there is one sent over step 7) can be contained in this response primitive.

At step 3, SLN2 sends certain SL information to the DLP. The SL information contained in this step could be determined based on dlScope contained in step 1; otherwise, SLN2 could be pre-configured or provisioned with a "dlScope" by an application. Additionally or alternatively, "dlScope" could be provided to SLN2 when SLN1 registers itself to SLN2. In this step, SLN2 may contain the following parameters:

dlStart: indicate when DLP should start to add the SL information to the DLS. For example,
dlStart=atOnce: to start immediately.
dlStart=timePeriod: to start after a time period as contained in dlStart.
dlStart=numOfSLInfo: to start after receiving numOfSLInfo pieces of SL information from SLN2.
slInfoID: the unique identifier for the entire SL information contained in this step.
slInfoHashFlag: indicates that the DLP needs to compress the received SL info (e.g., using a hash function), for example, when slInfoHashFlag=TRUE.
recipientID: the DLS account ID of the SLN that is the recipient of the DLS transaction to be generated in step 4. The recipient could be SLN1 or other SLNs.

At step 4, the DLP receives the SL information from SLN2. If dlStart=atOnce, if the DLP supports multiple DLS, DLP may first select an appropriate DLS based on information it exchanges with SLN2 during "DLP and SLN Association" and then generate a DLS transaction according to the transaction format used in the selected DLS and assign it using SLN2's private key (assuming SLN2 is the issuer of this DLS transaction). For example, the entire SL information as received in step 3 may be contained as the payload of the generated DLS transaction. If dlStart is not "atOnce", DLP may buffer the received SL information and start a timer (or a counter) with the value set to what was contained in dlStart. DLP may not generate a DLS transaction until the timer expires or the counter (which may be increased by one each time when DLP receives SL information from SLN2) exceeds numOfSLInfo. Optionally, DLP may hash or compress SL information to a value with a shorter size and may only contain the hashed value in the generated DLS transaction (e.g., when slInfoHashFlag was contained in step 3 with a value TRUE). An example of a transaction instance is illustrated in FIG. 17 where the issuer of this transaction is SLN2 and the recipient is SLN1. This proposed transaction format may have the following fields:

issuerID: the dlsAccountID of the issuer. In this example, the issuer is SLN2.
recipientID: the DLS account ID of the recipient, which was received from step 3. In this example, the recipient is SLN1.
otherFields: other fields or parameters that are specific to the DLS or can be used for future extension.
txTransaction: the transaction payload which contains SL info in the following ways as an example:
txPurpose: indicates the purpose of this transaction (e.g., "Interworking with SLS1").
slInfoType: indicates the type of SL information contained in this transaction. It could be "original (no hash)" or "hashed".
numOfSLInfo: indicates the number of SL information pieces contained in this transaction.

slInfoSize: indicates the size of a SL information piece.

slInfoContent: indicates the content of a SL information piece, which could be original SL info or the hash of original SL information, dependent on the value of slInfoType.

Signature: the hash of the transaction header plus the transaction payload against the issuer's private key, which has been created by DLP during "DLP and SLN Association".

At step 5, DLP sends the generated DLS transaction to its peer DLNs according to the DLS specifications.

When a peer DLN receives the transaction, it may verify if the transaction is valid. As part of this process, it may wait for or contact another DLP (referred to as DLP4SLN1) that serves SLN1 to further verify whether SL information in the transaction is really for SLN1. As such, DLP4SLN1 may extract the contained information from the transaction and send it to SLN1 for verification.

At step 6, DLP creates and maintains a mapping between the generated DLS transaction and the SL information or its hashed value. Note that Step 6 may occur before step 5 but after step 4, or as just a part of step 4.

At step 7, DLP sends a response back to SLN2. The response message may contain for example the identifier of the generated DLS transaction (if any) in step 4, the hash of each SL information piece contained in the DLS transaction, and/or slInfoID of each SL information piece contained in the DLS transaction.

At step 8, SLN2 receives the response from DLP and stores the information contained in the response (e.g., to maintain the mapping between SL information and corresponding DLS transaction).

At step 9, at some time later, the DLS transaction sent in step 5 is successfully added into a new transaction set (e.g., a Block in Ethereum systems) which has been validated by all DLNs in the DLS.

At step 10, DLP verifies the transaction set according to the consensus protocols used in the DLS and updates the status information of the DLS transaction sent in step 5. For example, its status may be changed to "confirmed" and the identifier of the transaction set may be added to it.

In FIG. 16, it is understood that step 3 from SLN2 to DLP could be from SLN1 to DLP as well (e.g., if dlAction=1 in step 1 that implies SLN1 should be responsible for adding SL information to distributed ledgers). Then, step 7 may be from DLP to SLN1. It is further understood that step 1 and step 2 are not mandatory. Some local events at SLN2 (e.g., a new notification is sent to a subscriber or a notification target, SLN2 just forwards a SL message which is sent from another SLN3 to another SLN4, etc.) could trigger SLN2 to start step 3 to communicate with DLP.

Figure 18:
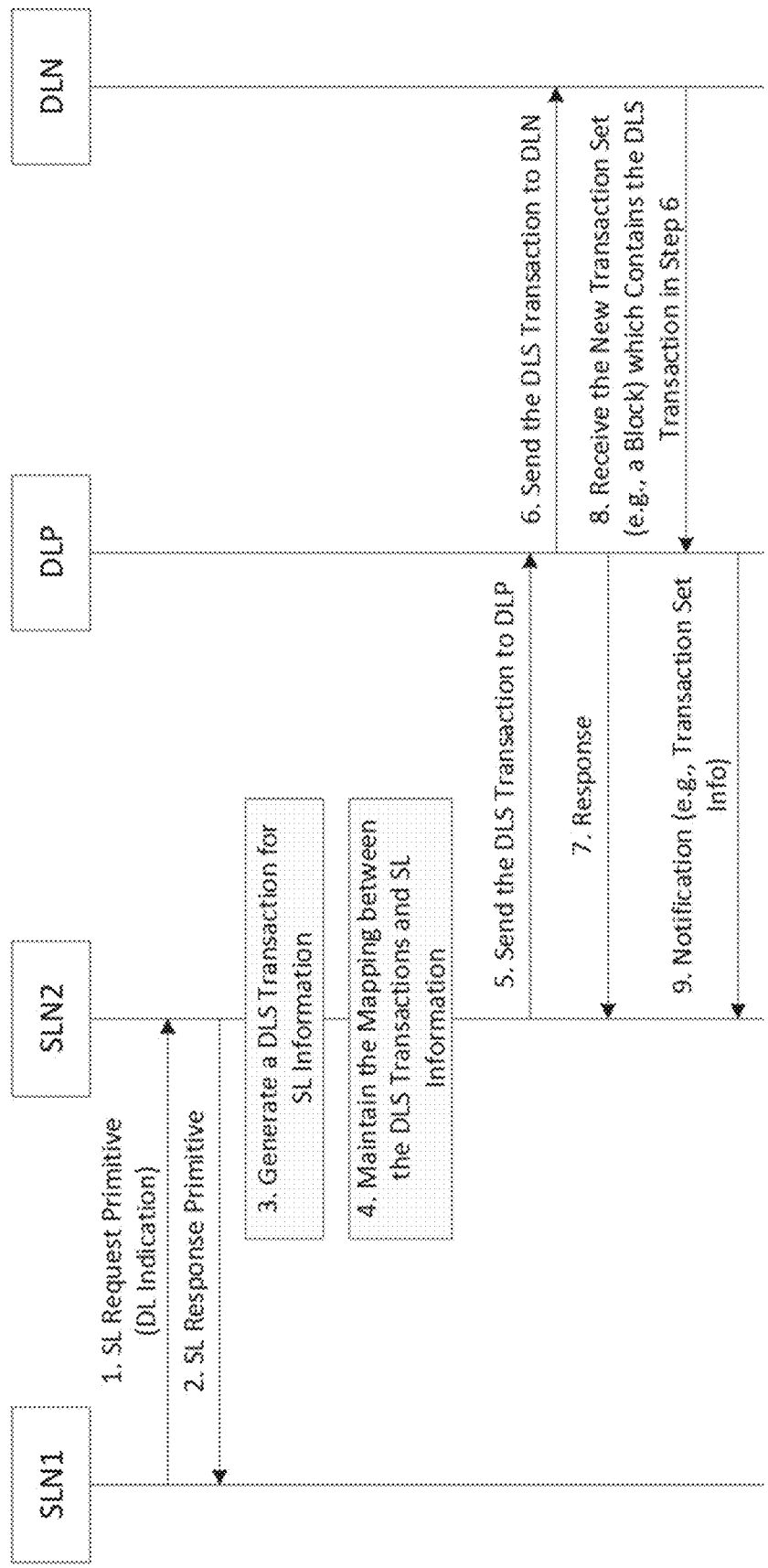
FIG. 18 shows a flow chart of a second example method for adding service layer information to distributed layers.

FIG. 18 illustrates an example alternative procedure for the method described in connection with FIG. 16. In this alternative procedure, SLN2 (or SLN1) knows the format of DLS transaction and accordingly generates a DLS transaction for SL information to be stored in distributed ledgers. As a result, what SLN2 (or SLN1) sends to DLP is not plain SL information, but a DLS transaction.

Step 1 may be the same at step 1 in FIG. 16.

Step 2 may be the same at step 2 in FIG. 16. However, it is possible for step 2 in FIG. 18 to occur after step 3; in this case, the identifier of the generated DLS transaction can be contained in the response primitive to SLN1.

At step 3, SLN2 generates a DLS transaction according to the transaction format which has been obtained from DLP during "DLP and SLN Association".

Step 4 may be the same at step 6 in FIG. 16.

At step 5, SLN2 sends the DLS transaction to DLP.

At step 6, DLP forwards the DLS transaction to its peer DLNs in the DLS.

At step 7, DLP sends a response to SLN2.

Step 8 may be the same as step 9 in FIG. 16.

At step 9, DLP notifies SLN2 that the DLS transaction has been successfully added to the DLS and has been confirmed. In this message, DLP may include the transaction set information as received in step 8 from peer DLNs.

In FIG. 18, it is understood that step 3 from SLN2 to DLP could be from SLN1 to DLP as well (e.g., if dlAction=1 in Step 1 that implies SLN1 should be responsible for adding SL information to distributed ledgers). Then, SLN1 may handle step 3-step 9 as shown in the figure for SLN2. In addition, step 1 and step 2 may not be mandatory. Some local events at SLN2 (e.g., a new notification is sent to a subscriber or a notification target) could trigger SLN2 to start step 3 to communicate with DLP.

Figure 19A:
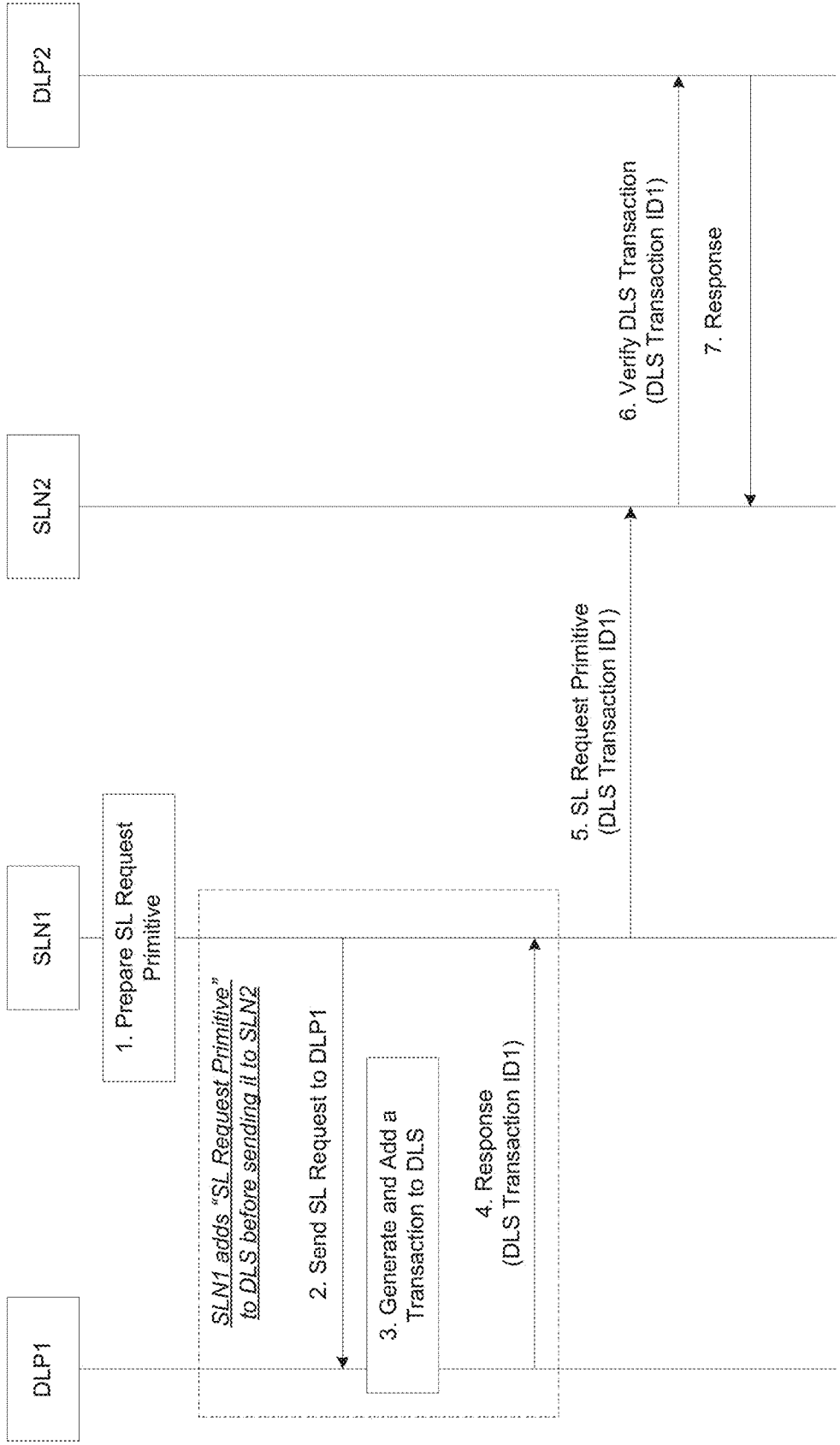
FIGS. 19A and 19B show a flow chart of a third example method for adding service layer information to distributed layers.
Figure 19B:
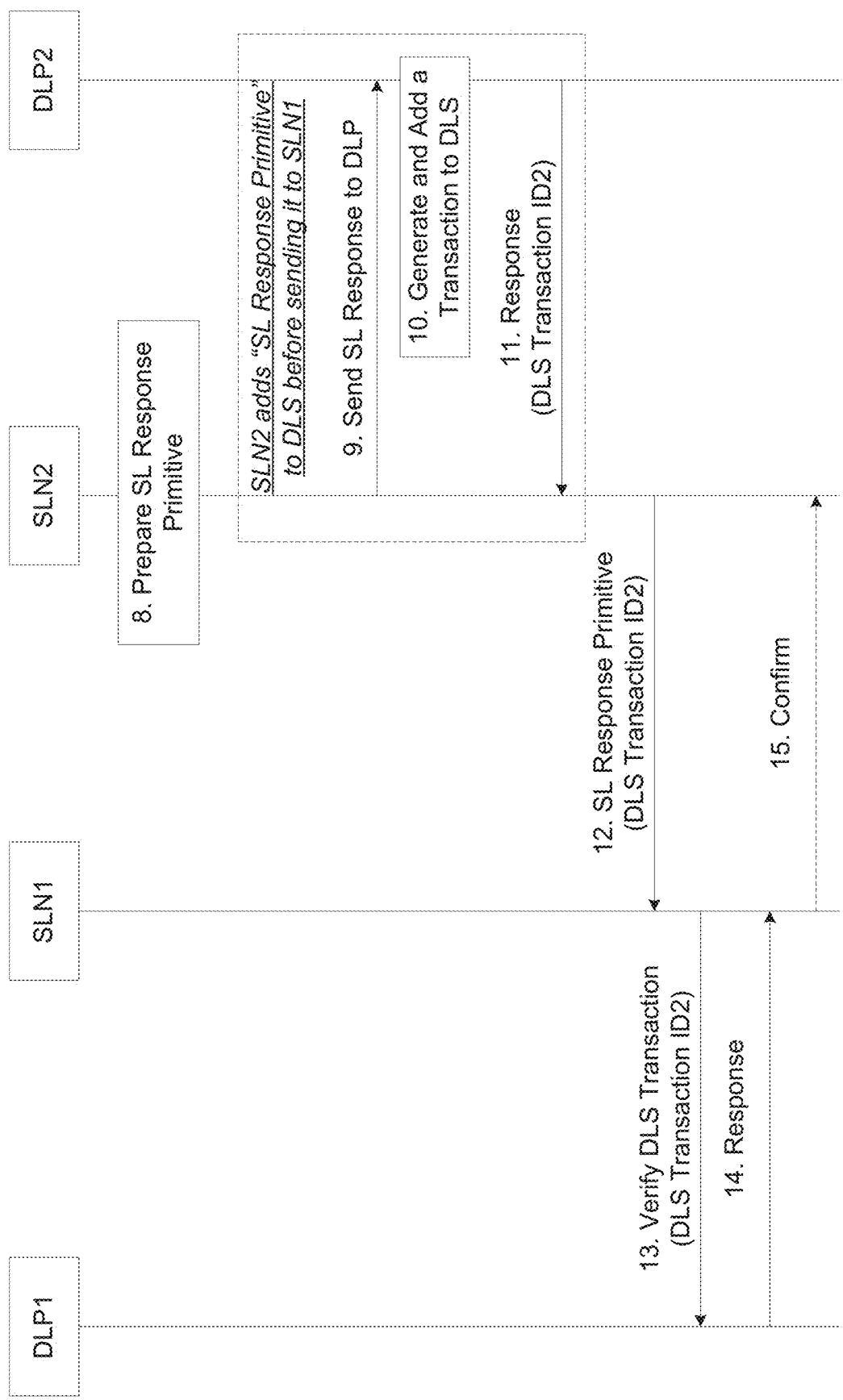

FIG. 19 illustrates another alternative procedure for adding service layer information to distributed ledgers. In this example, SLN1 and SLN2 are deployed in an ad hoc mode, but they have no registration relationship. SLN1 and SLN2 leverage a DLS to store their SL primitives and each may be associated with a DLP (e.g., DLP1 for SLN1 and DLP2 for SLN2). In other words, the originator SLN1 first adds a SL request primitive to the DLS via DLP1 before it sends the SL request primitive to the recipient SLN2. Likewise, SLN2 may also need to add the SL response primitive to the DLS via DLP2 before it sends the SL response primitive to SLN1. Note that DLP1 and DLP2 are two logic entities and they could be the same DLP. The following example steps may be needed:

At step 1, SLN1 prepares the SL request primitive.

At step 2, SLN1 sends the SL request primitive to DLP1. Alternatively, SLN1 can assemble the SL request primitive in a DLS transaction and send the DLS transaction to DLP1.

At step 3, DLP1 receives the message from step 2 and adds corresponding SL information to the DLS.

At step 4, DLP1 sends the DLS transaction ID to SLN1.

At step 5, after receiving the response from DLP1 and knowing the SL request primitive has been successfully added to the DLS, SLN1 sends the SL request primitive to SLN2 based on SL protocol. SLN1 also piggybacks DLS Transaction ID1 from step 4 in this step.

At step 6, after receiving the SL request primitive from SLN1, SLN2 contacts DLP2 to verify if the transaction with DLS Transaction ID1 has been previously added to the distributed ledgers.

At step 7, DLP2 sends a response to SLN2.

At step 8, if the transaction with DLS Transaction ID1 has been added to the distributed ledgers as indicated in step 7, SLN2 prepares the SL response primitive.

At step 9, SLN2 sends the SL response primitive to DLP2. Alternatively, SLN2 can assemble the SL response primitive in a DLS transaction and send the DLS transaction to DLP2.

At step 10, DLP2 receives the message from step 9 and adds corresponding SL information to the DLS.

At step 11, DLP2 sends the DLS transaction ID to SLN2.

At step 12, after receiving the response from DLP2 and knowing the SL response primitive has been successfully added to the DLS, SLN2 sends the SL response primitive to SLN1 based on SL protocol. SLN2 may also piggyback DLS Transaction ID2 from step 11 in this step.

At step 13, after receiving the SL response primitive from SLN2, SLN1 contacts DLP1 to verify if the transaction with DLS Transaction ID2 has been previously added to distributed ledgers.

At step 14, DLP1 sends a response to SLN1.

At step 15, if the transaction with DLS Transaction ID2 has been added to distributed ledgers as indicated in step 14, SLN1 may additionally send a confirmation message to SLN2.

Methods and systems for querying and/or retrieving transactions from distributed ledgers are disclosed herein.

A SLN can send a transaction filter to a DLP to query and potentially retrieve transactions in distributed ledgers. As a response, the DLP can send a list of found transactions (e.g., their identifier, their content, or both) to the SLN. For example, after a recipient SLN asks a DLP to add SL information to a distributed ledger, the corresponding originator SLN can take the transaction identifier (from as notified by the originator SLN) as the filter to retrieve the transaction content from the same DLP, for instance, to verify if the transaction contains the original SL information.

Figure 20:
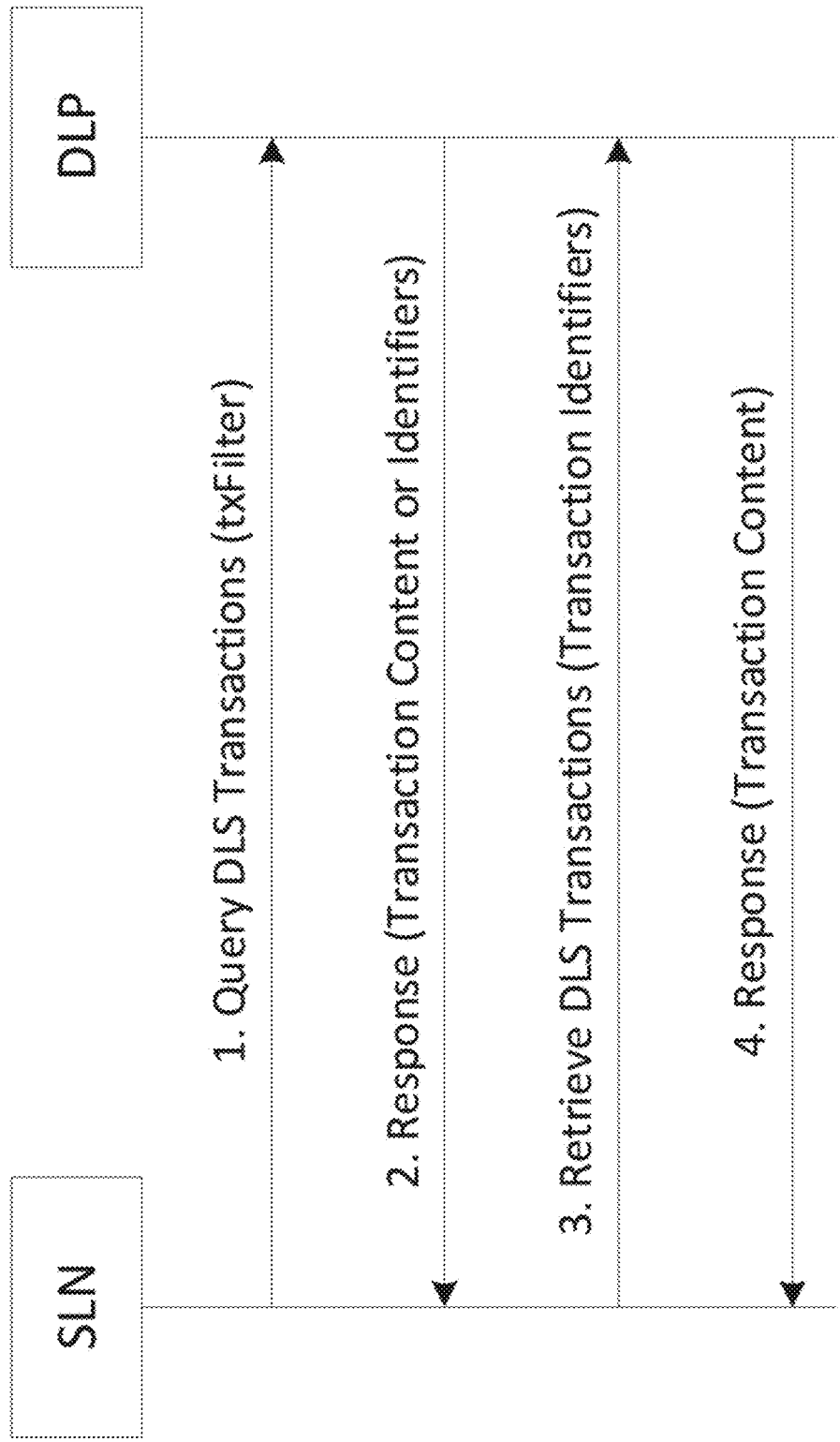
FIG. 20 shows a flow chart of an example method for querying transactions in a distributed ledger system.

FIG. 20 illustrates procedures for a SLN to query/retrieve transactions from a DLP where distributed ledgers are maintained.

At step 1, SLN sends a query request to DLP. This request may contain a transaction filter (e.g., txFilter). The txFilter may contain one or more transaction properties (e.g., creation time, transaction identifier, the hash of SL information which has been contained in DLS transactions, etc.)

At step 2, DLP discovers matching DLS transactions based on txFilter contained in step 1. DLP may return the identifiers of discovered transactions or the content of each discovered transaction to SLN.

At step 3, if Step 2 only contains the identifiers of discovered transactions, SLN may send the identifier to DLP for retrieving the transaction content.

At step 4, DLP sends the transaction content to SLN.

Methods and systems for verifying a transaction status in distributed ledgers are disclosed herein.

A SLN can request a DLP to check or verify a current status of a DLS transaction which has been created previously to contain SL information. The SLN may give some transaction properties (e.g., transaction identifier) to the DLP so that the DLP can locate the right transaction.

For example, after a recipient SLN asks a DLP to add SL information to a distributed ledger, the corresponding originator SLN can send the transaction identifier to the DLP to check the current transaction status.

In another example, if both SLNs (SLN1 and SLN2) are deployed in an ad hoc mode or belong to different service providers, they may not have any service layer registration relationship. In this case, after both perform SL interactions, SLN1 (or SLN2) may use the procedures described in FIG. 16 to add their SL interaction information to distributed ledgers. Then, SLN2 (or SLN1) can use the procedures described in FIG. 21 to verify if its previous interaction with SLN1 has been indeed added to distributed ledgers.

Figure 21:
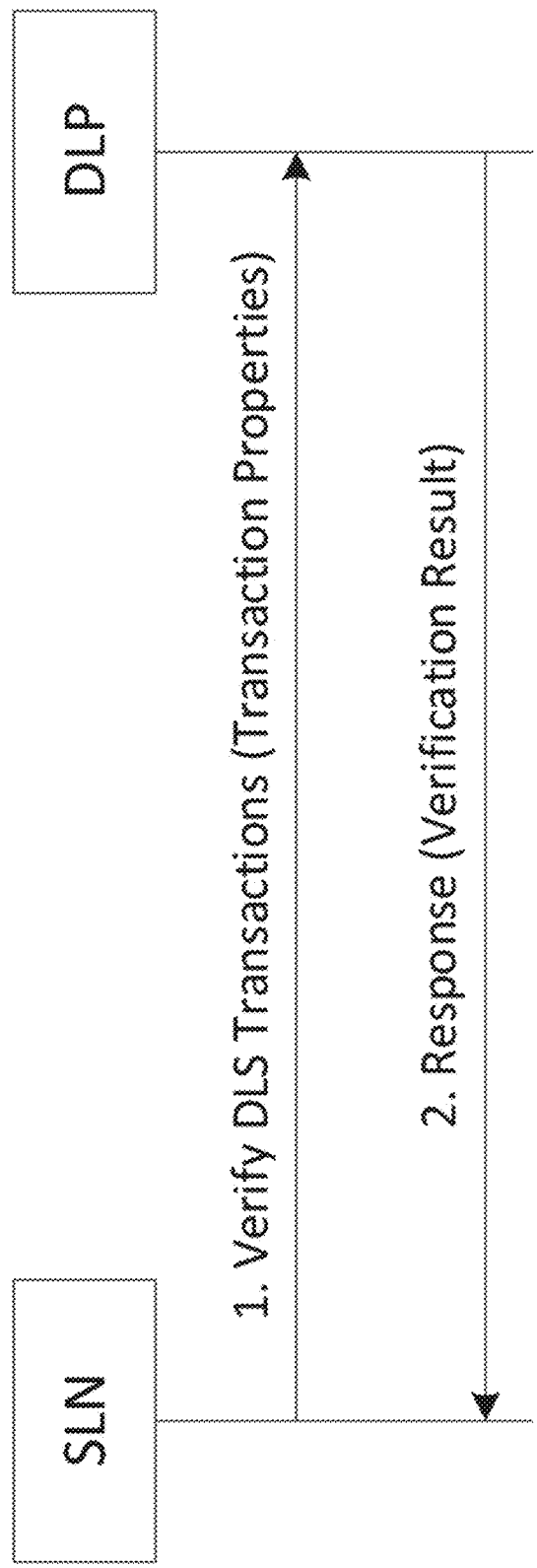
FIG. 21 shows a flow chart of an example method for verifying transactions in a distributed ledger system.

FIG. 21 illustrates an example procedure for a SLN to verify if a DLS transaction and/or a piece of SL information has been successfully added to and confirmed by a DLS.

At step 1, SLN sends a message to DLP for verifying the status of a DLS transaction or a piece of SL message. The status may be for example: buffered but not added to the DLS yet, added to but not confirmed by the DLS yet, confirmed by the DLS, etc. This message may contain the following parameters:

dlsTxID: the identifier of a DLS transaction, which could be previously generated by SLN, DLP, or other SLNs/DLPs. This parameter may contain a list of DLS transaction identifiers.

slInfoID: the identifier of a piece of SL information (e.g., a SL request message) which has been previously sent from a SLN (not necessarily the same SLN on FIG. 21) to a DLP (not necessarily the same SLN on FIG. 21). This parameter could contain a list of SL information identifiers.

slInfoHash: the hash of a piece of SL information (e.g., a SL request message) which has been previously sent from a SLN (not necessarily the same SLN on FIG. 21) to a DLP (not necessarily the same SLN on FIG. 21). This parameter may contain a list of SL information hashes.

previousStatus: the status of a DLS transaction or a piece of SL information which SLN knows and wants to be verified. This parameter may be optional.

dlsAccountIDForIssuer: the DLS account ID of the issuer.

dlsAccountIDForRecipient: the DLS account ID of the recipient.

At step 2, DLP searches the corresponding distributed ledger maintained locally or searches the maintained mapping between SL information and corresponding DLS transactions according to parameters contained in step 1. DLP finds the current status of corresponding DLS transactions or SL information as indicated in step 1. Then, DLP sends the current status to SLN or just sends a verification result (e.g., TRUE or FALSE) to SLN if previousStatus has been included in step 1.

Methods and systems for subscribing to distributed letter transactions are disclosed herein.

A SLN may make a subscription to a DLP with the intention to receive future automatic notifications from the DLP for some transaction-related events (e.g., when a new DLS transaction containing SL information is just added to the DLS). When a desired event occurs, the DLP may send a notification to the SLN. The notification may contain the identifier or entire content of DLS transactions related to the event.

For example, if both SLNs (SLN1 and SLN2) are deployed in an ad hoc mode or belong to different service providers, they may not have any service layer registration relationship. In this case, after both perform SL interactions SLN1 (or SLN2) may use the procedure in FIG. 16 to add their SL interaction information to distributed ledgers. Then, SLN2 (or SLN1) can use the procedure in FIG. 22 to subscribe to any DLS transaction being added by SLN1 (or SLN2). Then when the DLP that serves SLN2 receives the DLS transaction added by SLN1, the DLP may send an automatic notification to SLN2.

Figure 22:
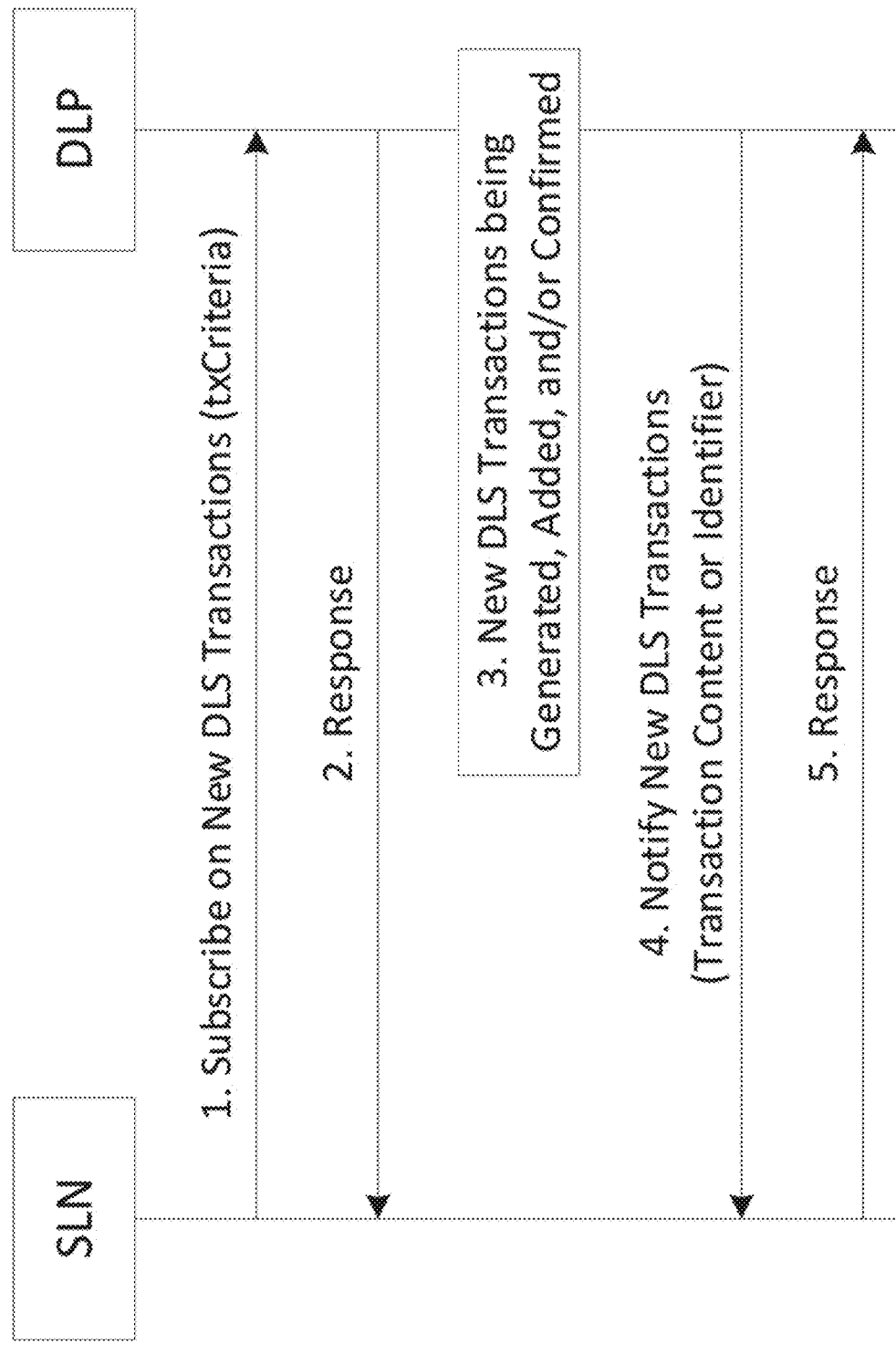
FIG. 22 shows a flow chart of an example method for subscribing to transactions in a distributed ledger system.

FIG. 22 illustrates a method for a SLN to make a subscription to a DLP for receiving automatic notifications when a new DLS transaction is generated, added, and/or confirmed to a DLS.

At step 1, SLN sends a subscription request to DLP, which informs DLP of notification conditions via the parameter txCriteria. txCriteria may be based for example on: the status of DLS transactions (e.g., generated, added, and/or confirmed), the issuer of DLS transactions (e.g., from a specific SLN or DLP), the generation time of DLS transactions, the size of DLS transactions, the content type of DLS transactions (e.g., SL request primitives, about SL response primitives, a specific type of SL request/response primitives, etc.), and/or other DLS transaction properties.

At step 2, DLP processes the subscription request and sends a response to SLN.

At step 3, new transactions which meet txCriteria have been generated (or received) by DLP, added to the DLS by DLP or other DLPs, and/or confirmed to the DLS.

At step 4, DLP sends a notification to SLN. This notification may contain the identifier or entire content of DLS transactions which satisfy txCriteria.

At step 5, SLN sends a response to DLP.

The interactions between a SLN and a DLP disclosed herein can be implemented in oneM2M service layer. As such, some new oneM2M resources, new oneM2M attributes, new oneM2M request parameters, new oneM2M response parameters, and new oneM2M RESTful operations are proposed. In addition, DLP functionalities which are involved in interactions with SLNs can be implemented as oneM2M RESTful operations. For example, a oneM2M CSE (or even an AE) can use the procedures described herein to create a DLS transaction at a DLP. In this case, the DLP maintains <dlsTx> resources and acts as an oneM2M hosting CSE.

Based on the disclosed methods and systems, a CSE can assemble the SL information stored in any oneM2M resource (e.g., in a <request> resource, events about an AE or CSE registration, notification events related to an existing <subscription> resource, ect.) to a DLS transaction and send it to a DLP, or it can simply send the SL information to the DLP where a DLS transaction will be generated based on the SL information. Then, the DLP helps to add the DLS transaction to distributed ledgers. In either case, the CSE may need to record the DLS transaction information in the original oneM2M resource, for instance, using the new attributes as proposed in Table 2.

For example, oneM2M specifies <request> as a resource type, which can only be implicitly created by a receiver CSE as a result of a request from an originator CSE which contains the Response Type parameter in the request message and where Response Type parameter is set to 'non-BlockingReqeustSynch' or 'nonBlockingRequestAsynch'. The receiver CSE can store a <request> resource into distributed ledgers with the aid of a DLP.

TABLE 2

New Common Attributes

| Attribute Name | Description |
| --- | --- |
| dlsTxID | Indicates the identifier of the DLS transaction that has been generated based on information of the parent oneM2M resources (e.g., some of its attributes or the entire resource representation). For example, dlsTxID can be added to a <request> resource, a <subscription> resource, a <contentInstance> resource, etc. Note that dlsTxID could be the transaction identifier used in the DLS or the identifier of a corresponding <dlsTx> resource being created at the SL. |
| dlsTxStatus | Indicates the latest status of the DLS transaction that has been generated based on information of the parent oneM2M resources (e.g., some of its attributes or the entire resource representation). The status could be generated by a DLN, sent to the DLS (or received by DLNs from the DLS), appended to distributed ledgers and confirmed by the DLS (e.g., after running the consensus protocol at each participating DLN). This attribute may not be needed if dlsTxID points to a <dlsTx> resource being created at the SL, which describes a DLS transaction including its status. |

In one example, the originator CSE may contain "DL Indication" in an oneM2M request primitive to inform the receiver CSE whether and how to add the SL information contained in the request primitive to distributed ledgers. Accordingly, several new oneM2M request parameters are proposed, such as those shown in Table 3. These new request parameters can be also introduced as new attributes for oneM2M <request> resource type.

TABLE 3

Summary of New Request Primitive Parameters

| | Request message parameter | Operation | | | | |
| --- | --- | --- | --- | --- | --- | --- |
| | | Create | Retrieve | Update | Delete | Notify |
| Optional | dlAction - Indicate if the originator CSE or the receiver CSE needs to trigger adding SL information of the present request primitive to a DLS | ○ | ○ | ○ | ○ | ○ |
| | dlScope - Indicate which part of SL information of this request and corresponding response primitive shall be added to the DLS. | ○ | ○ | ○ | ○ | ○ |
| | targetDLP - Indicate the address of target DLP. | ○ | ○ | ○ | ○ | ○ |
| | typeOfTargetDLS - Indicate the type of target DLSs that the originator CSE requires or prefers the receiver CSE to leverage. | ○ | ○ | ○ | ○ | ○ |

In one example, the receiver CSE may contain some final decisions on "DL Indication" in a oneM2M response primitive to inform the originator CSE whether and how the SL information contained in the request and/or response primitives will be added to distributed ledgers. Accordingly, several new oneM2M response parameters are proposed and described in Table 4, which the receiver CSE can contain in the response primitive to be sent to the originator CSE.

Figure 24:
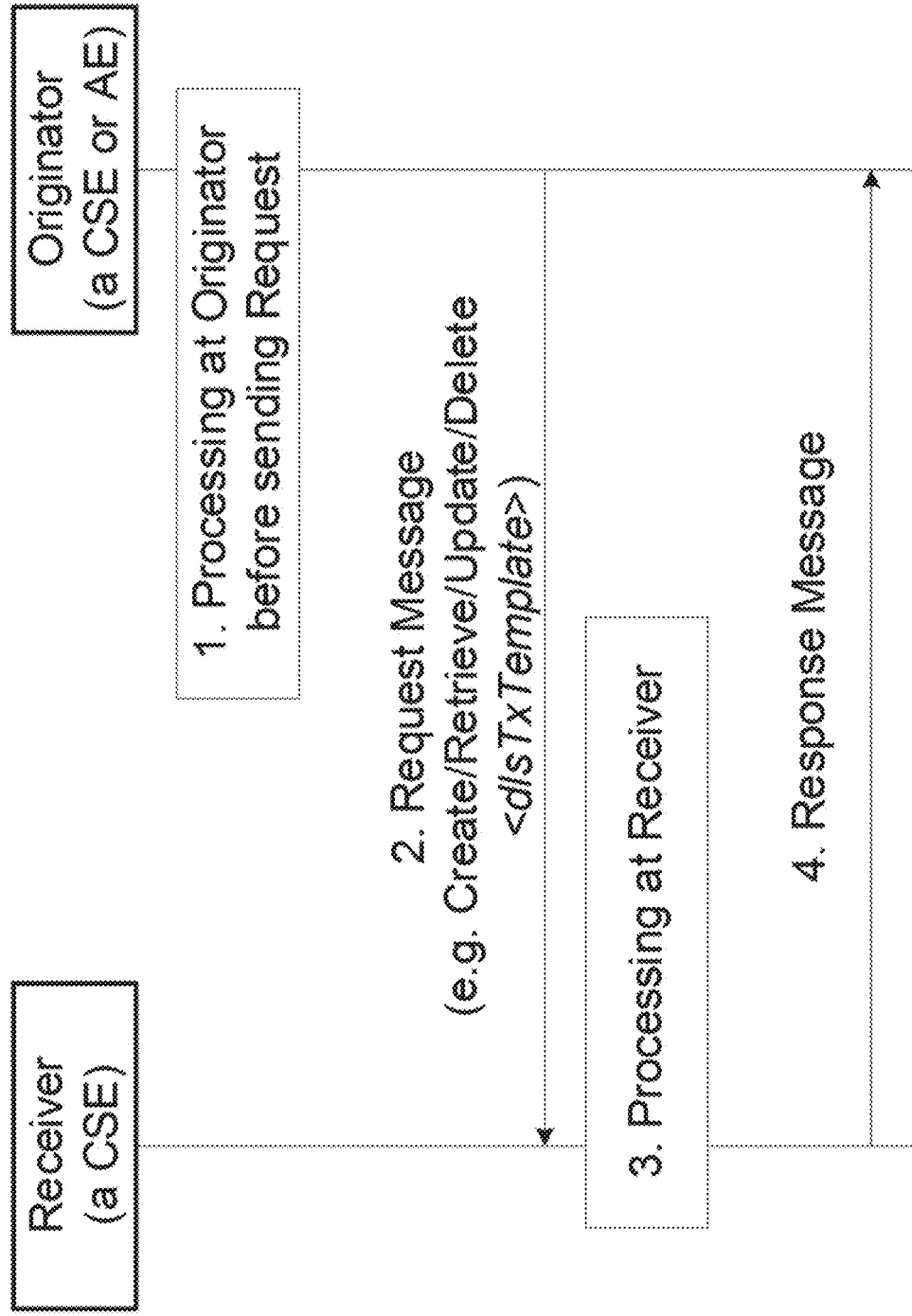
FIG. 24 shows an example method for operating a <dlsTxTemplate> resource.

FIG. 24 illustrates an example procedure to operate a <dlsTxTemplate> resource (e.g., Create/Retrieve/Update/Delete a <dlsTxTemplate> resource). The Originator can be a CSE or an AE, while the Receiver may be a CSE. Detailed descriptions are given in Table 7, Table 8, Table 9, and Table 10, respectively.

The procedure shown in FIG. 24 may be used for creating a <dlsTxTemplate> resource as described in Table 7.

TABLE 1

Summary of New Response Primitive Parameters

Figure 23:
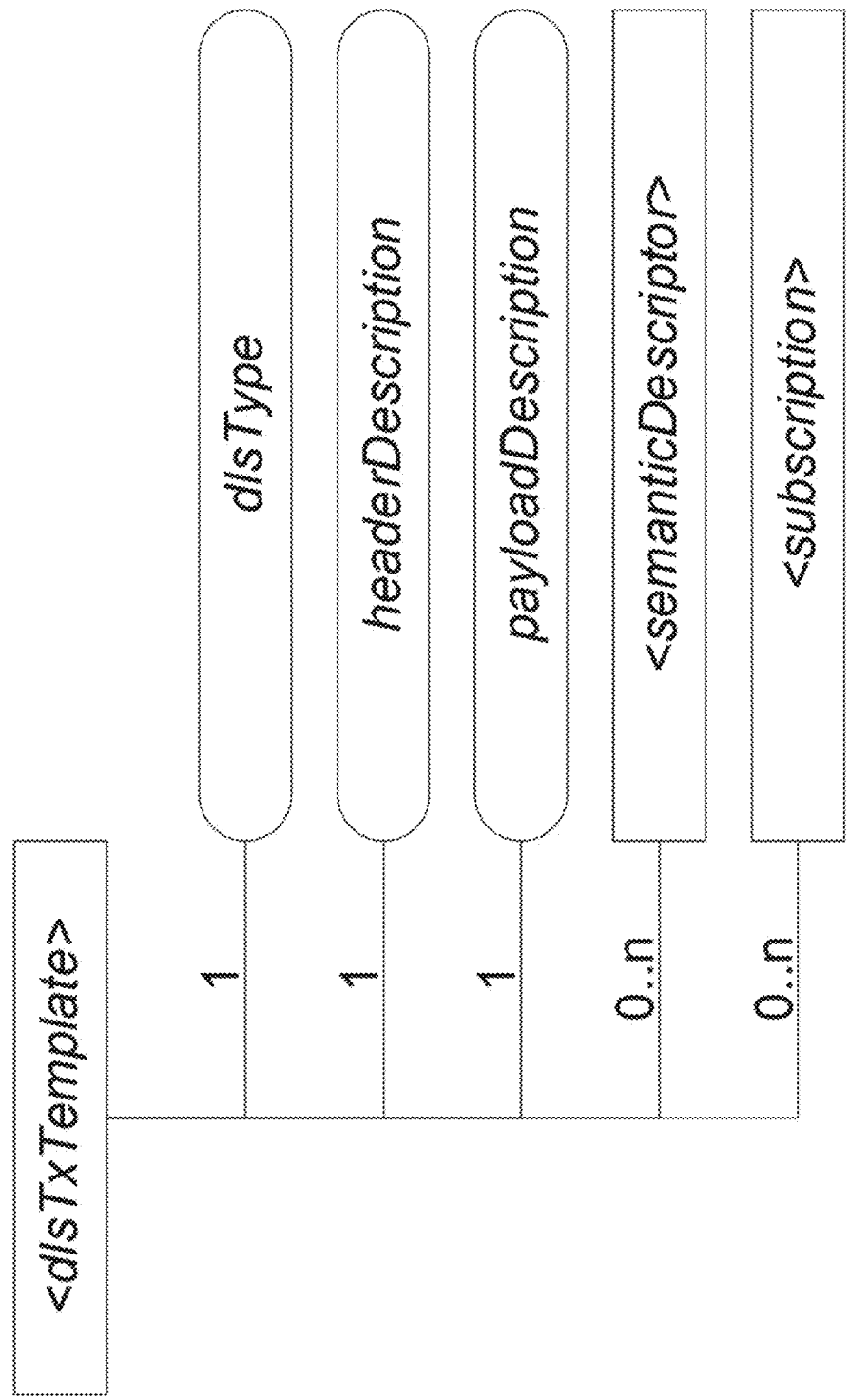
FIG. 23 shows an example structure of a <dlsTxTemplate> resource for a transaction template format used in a distributed ledger system.

| Request message parameter | | Operation | | | | |
|---|---|---|---|---|---|---|
| | | Create | Retrieve | Update | Delete | Notify |
| Optional | dlActionFinal - Indicate the final dlAction which the receiver CSE decides. | ○ | ○ | ○ | ○ | ○ |
| | dlScopeFinal - Indicate the final dlScope which the receiver CSE decides | ○ | ○ | ○ | ○ | ○ |
| | targetDLPFinal - Indicate the address of final target DLP which the receiver CSE decides. | ○ | ○ | ○ | ○ | ○ | dlsTxTemplate represents a transaction format which is used in a DLS. A DLP can create a dlsTxTemplate at a CSE, which can be discovered and retrieved by other AEs/CSEs if they need to create a DLS transaction for certain pieces of SL information. Note that the DLP could be a CSE or an AE. The structure of dlsTxTemplate resource is illustrated in FIG. 23. The <dlsTxTemplate> resource may contain the child resources specified in Table 5.

TABLE 2

Child resources of <dlsTxTemplate> resource

| Child Resources of <dlsTxTemplate> | Child Resource Type | Multiplicity | Description | <dlsTxTemplate> Child Resource Types |
|---|---|---|---|---|
| [variable] | <subscription> | 0 . . . n | A child resource used to make subscriptions on <dlsTxTemplate> resource. | <subscription> |
| [variable] | <semanticDescriptor> | 0 . . . n | Semantic description on <dlsTxTemplate> resource. | <semanticDescriptor> |

TABLE 4

| <dlsTxTemplate> CREATE | |
|---|---|
| <dlsTxTemplate> CREATE | |
| Associated Reference Point | Mca, Mcc and Mcc'. |

The <dlsTxTemplate> resource may contain the attributes specified in Table 6.

TABLE 3

Attributes of <dlsTxTemplate> resource

| Attributes of <dlsTxTemplate> | Multiplicity | RW/RO/WO | Description | <dlsTxTemplate> Attributes |
|---|---|---|---|---|
| dlsType | 1 | WO | Indicates the type of DLSs which use the transaction format as described by this resource. | OA |
| headerDescription | 1 | RW | Describes the fields/parameters included in the transaction header part. | OA |
| payloadDescription | 1 | RW | Indicates the fields/parameters included in the transaction payload part. | OA |

TABLE 4-continued

| | <dlsTxTemplate> CREATE <dlsTxTemplate> CREATE |
|---|---|
| Information in Request message | All parameters defined in Table 8.1.2-3 in oneM2M-TS-0001 apply with the specific details for: Content: The resource content shall provide the information about a <dlsTxTemplate> resource (e.g. attribute values). |
| Processing at Originator before sending Request | According to clause 10.1.1.1 in oneM2M-TS-0001. |
| Processing at Receiver | According to clause 10.1.1.1 in oneM2M-TS-0001. |
| Information in Response message | All parameters defined in Table 8.1.3-1 in oneM2M-TS-0001 apply with the specific details for: Content: Address of the created <dlsTxTemplate> resource according to clause 10.1.1.1 in oneM2M-TS-0001. |
| Processing at Originator after receiving Response | According to clause 10.1.1.1 in oneM2M-TS-0001. |
| Exceptions | According to clause 10.1.1.1 in oneM2M-TS-0001. |

The procedure shown in FIG. 24 may be used for retrieving the attributes of an existing <dlsTxTemplate> resource as described in Table 8.

TABLE 5

| | <dlsTxTemplate> RETRIEVE <dlsTxTemplate> RETRIEVE |
|---|---|
| Associated Reference Point | Mca, Mcc and Mcc'. |
| Information in Request message | All parameters defined in Table 8.1.2-3 in oneM2M-TS-0001 apply with the specific details for: Content: void. |
| Processing at Originator before sending Request | According to clause 10.1.2 in oneM2M-TS-0001. |
| Processing at Receiver | The Receiver shall verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 applies. |
| Information in Response message | All parameters defined in Table 8.1.3-1 in oneM2M-TS-0001 apply with the specific details for: Content: attributes of the <dlsTxTemplate> resource. |
| Processing at Originator after receiving Response | According to clause 10.1.2 in oneM2M-TS-0001. |
| Exceptions | According to clause 10.1.2 in oneM2M-TS-0001. |

The procedure shown in FIG. 24 may be used to update an existing <dlsTxTemplate> resource as described in Table 9.

TABLE 6

| | <dlsTxTemplate> UPDATE <dlsTxTemplate> UPDATE |
|---|---|
| Associated Reference Point | Mca, Mcc and Mcc'. |
| Information in Request message | All parameters defined in Table 8.1.2-3 in oneM2M-TS-0001 apply with the specific details for: Content: attributes of the <dlsTxTemplate> resource to be updated. |
| Processing at Originator before sending Request | According to clause 10.1.3 in oneM2M-TS-0001. |
| Processing at Receiver | According to clause 10.1.3 in oneM2M-TS-0001. |
| Information in Response message | According to clause 10.1.3 in oneM2M-TS-0001. |
| Processing at Originator after receiving Response | According to clause 10.1.3 in oneM2M-TS-0001. |
| Exceptions | According to clause 10.1.3 in oneM2M-TS-0001. |

The procedure shown in FIG. 24 may be used to delete an existing <dlsTxTemplate> resource as described in Table 10.

TABLE 7

Figure 25:
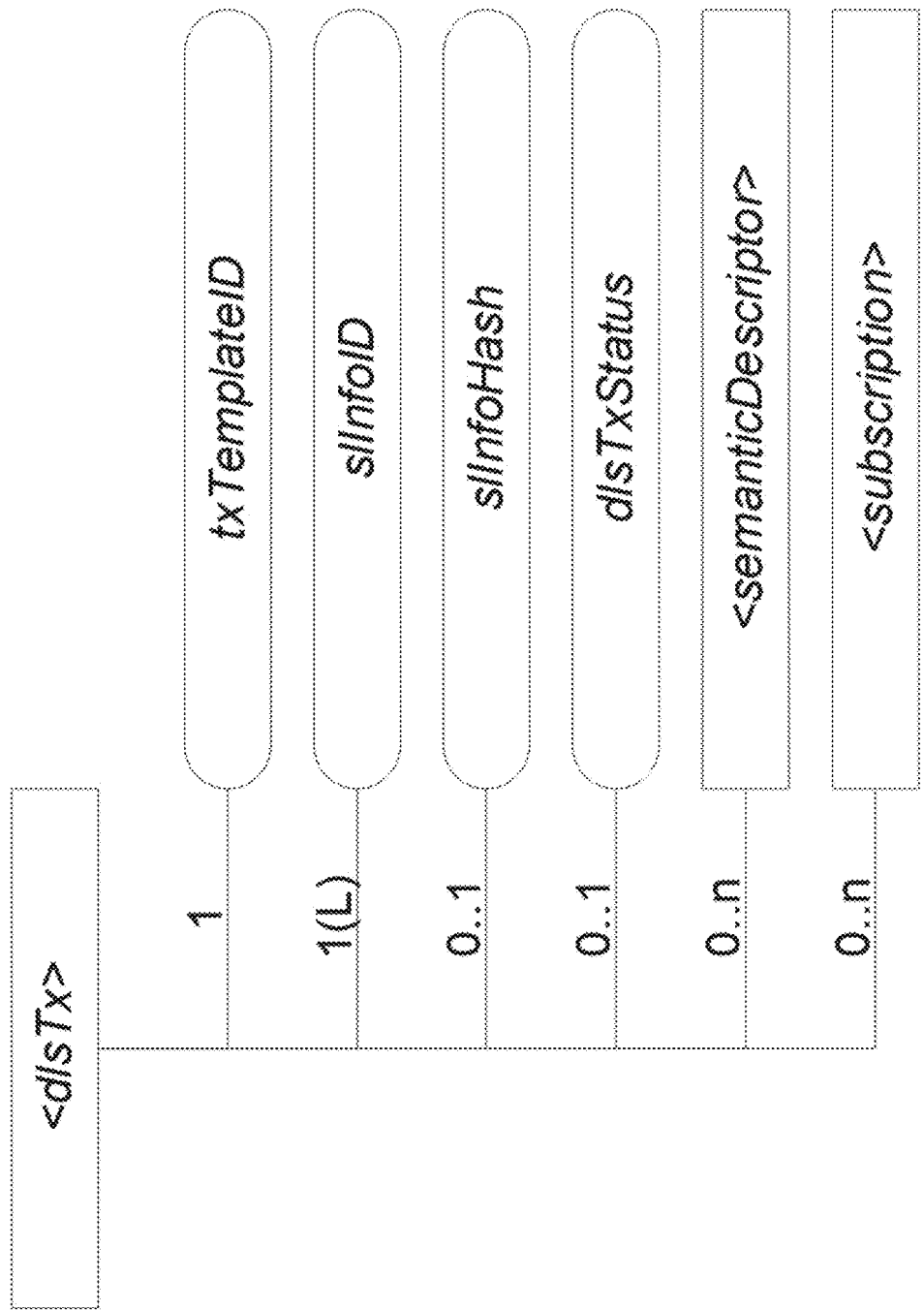
FIG. 25 shows an example structure of a <dlsTx> resource for a transaction instance related to a distributed ledger system.

| | <dlsTxTemplate> DELETE <dlsTxTemplate> DELETE |
|---|---|
| Associated Reference Point | Mca, Mcc and Mcc'. |
| Information in Request message | All parameters defined in Table 8.1.2-3 in oneM2M-TS-0001 apply. |
| Processing at Originator before sending Request | According to clause 10.1.4.1 in oneM2M-TS-0001. |
| Processing at Receiver | According to clause 10.1.4.1 in oneM2M-TS-0001. |
| Information in Response message | According to clause 10.1.4.1 in oneM2M-TS-0001. |
| Processing at Originator after receiving Response | According to clause 10.1.4.1 in oneM2M-TS-0001. |
| Exceptions | According to clause 10.1.4.1 in oneM2M-TS-0001. | disTx represents a DLS transaction, which could be generated at a CSE or at a DLP. The structure of disTx resource is illustrated in FIG. 25. The <dlsTx> resource may contain the child resources specified in Table 11.

TABLE 8

Child resources of <dlsTx> resource

| Child Resources of <dlsTx> | Child Resource Type | Multiplicity | Description | <dlsTx> Child Resource Types |
|---|---|---|---|---|
| [variable] | <subscription> | 0 . . . n | A child resource used to make subscriptions on <dlsTx> resource. | <subscription> |
| [variable] | <semanticDescriptor> | 0 . . . n | Semantic description on <dlsTx> resource. | <semanticDescriptor> |

The <dlsTx> resource may contain the attributes specified in Table 12.

TABLE 9

Attributes of <dlsTx> resource

| Attributes of <dlsTx> | Multiplicity | RW/RO/WO | Description | <dlsTx> Attributes |
|---|---|---|---|---|
| txTemplateID | 1 | WO | Indicates the identifier of a <dlsTxTemplate> resource based on which the DLS transaction as represented by this resource is created. | OA |
| slInfoID | 1 (L) | RW | Indicates the list of identifiers of original SL information which has been contained in the DLS transaction as represented by this resource. For example, if original SL information is one or more than one <request> resources, the value of this attribute will be the identifiers of those <request> resources. | OA |
| slInfoHash | 0 . . . 1 | RW | Indicates the hash of all original SL information which has been contained in the DLS transaction as represented by this resource. | OA |
| dlsTxStatus | 0 . . . 1 | | Indicates the status of the DLS transaction as represented by this resource | OA |

Figure 26:
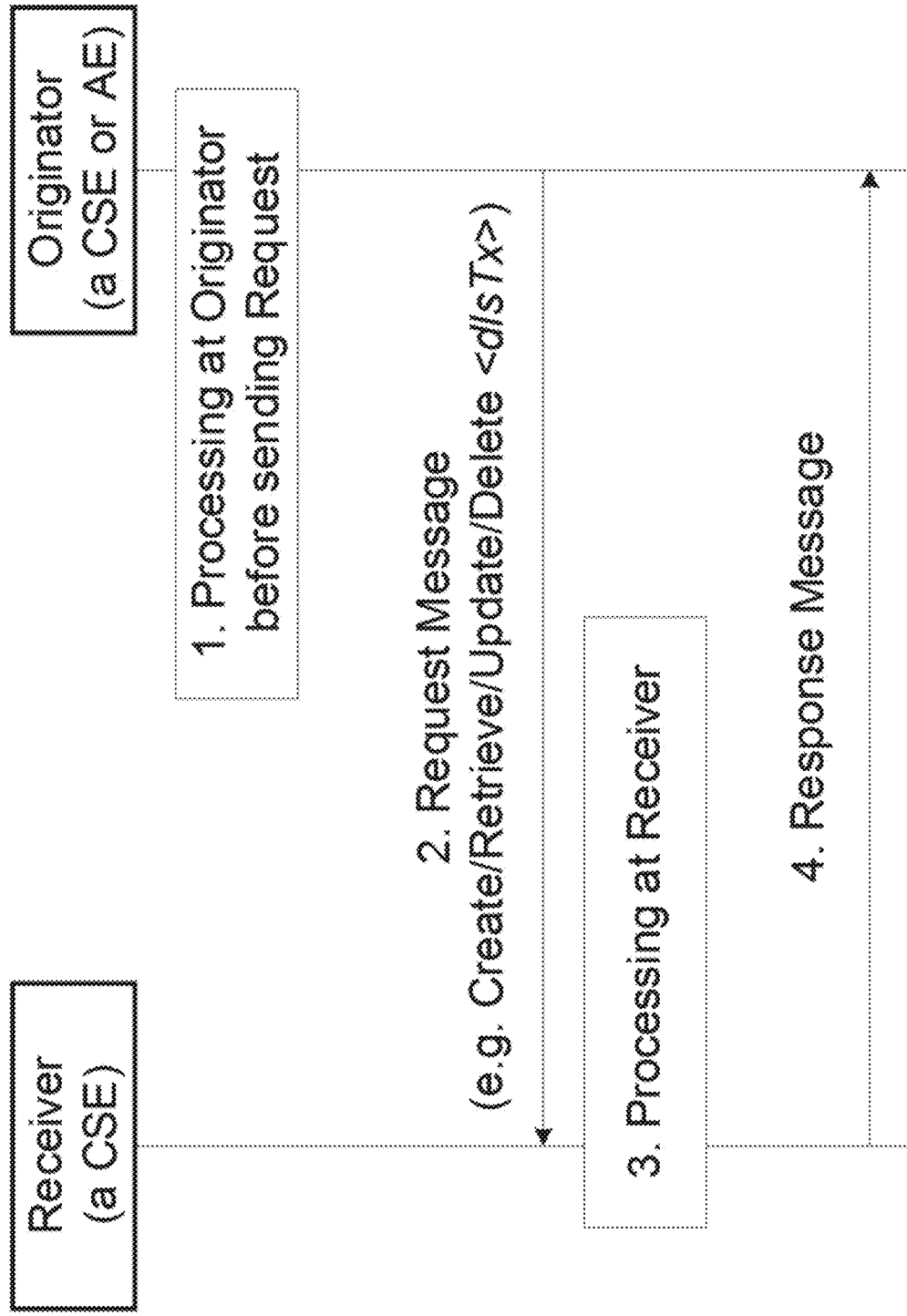
FIG. 26 shows an example method for operating a <dlsTx> resource.

FIG. 26 illustrates an example procedure to operate a <dlsTx> resource (e.g., Create/Retrieve/Update/Delete a <dlsTx> resource). The Originator can be a CSE or an AE, while the Receiver is a CSE. Detailed descriptions are given in Table 13, Table 14, Table 15, and Table 16, respectively.

The procedure shown in FIG. 26 may be used for creating a <dlsTx> resource as described in Table 13.

TABLE 10

| <dlsTx> CREATE | |
|---|---|
| <dlsTx> CREATE | |
| Associated Reference Point | Mca, Mcc and Mcc'. |
| Information in Request message | All parameters defined in Table 8.1.2-3 in oneM2M-TS-0001 apply with the specific details for: Content: The resource content shall provide the information about a <dlsTx> resource (e.g. attribute values). |
| Processing at Originator before sending Request | According to clause 10.1.1.1 in oneM2M-TS-0001. |
| Processing at Receiver | According to clause 10.1.1.1 in oneM2M-TS-0001. |
| Information in Response message | All parameters defined in Table 8.1.3-1 in oneM2M-TS-0001 apply with the specific details for: Content: Address of the created <dlsTx> resource according to clause 10.1.1.1 in oneM2M-TS-0001. |
| Processing at Originator after receiving Response | According to clause 10.1.1.1 in oneM2M-TS-0001. |
| Exceptions | According to clause 10.1.1.1 in oneM2M-TS-0001. |

The procedure shown in FIG. 26 may be used for retrieving the attributes of an existing <dlsTx> resource as described in Table 14.

TABLE 11

| <dlsTx> RETRIEVE | |
|---|---|
| <dlsTx> RETRIEVE | |
| Associated Reference Point | Mca, Mcc and Mcc'. |

TABLE 11-continued

| <dlsTx> RETRIEVE | |
|---|---|
| <dlsTx> RETRIEVE | |
| Information in Request message | All parameters defined in Table 8.1.2-3 in oneM2M-TS-0001 apply with the specific details for: Content: void. |
| Processing at Originator before sending Request | According to clause 10.1.2 in oneM2M-TS-0001. |
| Processing at Receiver | The Receiver shall verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 applies. |
| Information in Response message | All parameters defined in Table 8.1.3-1 in oneM2M-TS-0001 apply with the specific details for: Content: attributes of the <dlsTx> resource. |
| Processing at Originator after receiving Response | According to clause 10.1.2 in oneM2M-TS-0001. |
| Exceptions | According to clause 10.1.2 in oneM2M-TS-0001. |

The procedure shown in FIG. 26 may be used to update an existing <dlsTx> resource as described in Table 15.

TABLE 12

| <dlsTx> UPDATE | |
|---|---|
| <dlsTx> UPDATE | |
| Associated Reference Point | Mca, Mcc and Mcc'. |
| Information in Request message | All parameters defined in Table 8.1.2-3 in oneM2M-TS-0001 apply with the specific details for: Content: attributes of the <dlsTx> resource to be updated. |
| Processing at Originator before sending Request | According to clause 10.1.3 in oneM2M-TS-0001. |

TABLE 12-continued

| | |
|---|---|
| <dlsTx> UPDATE | |
| <dlsTx> UPDATE | |
| Processing at Receiver | According to clause 10.1.3 in oneM2M-TS-0001. |
| Information in Response message | According to clause 10.1.3 in oneM2M-TS-0001. |
| Processing at Originator after receiving Response | According to clause 10.1.3 in oneM2M-TS-0001. |
| Exceptions | According to clause 10.1.3 in oneM2M-TS-0001. |

The procedure shown in FIG. 26 may be used to delete an existing <dlsTx> resource as described in Table 16.

TABLE 13

| | |
|---|---|
| <dlsTx> DELETE | |
| <dlsTx> DELETE | |
| Associated Reference Point | Mca, Mcc and Mcc'. |
| Information in Request message | All parameters defined in Table 8.1.2-3 in oneM2M-TS-0001 apply. |
| Processing at Originator before sending Request | According to clause 10.1.4.1 in oneM2M-TS-0001. |
| Processing at Receiver | According to clause 10.1.4.1 in oneM2M-TS-0001. |
| Information in Response message | According to clause 10.1.4.1 in oneM2M-TS-0001. |
| Processing at Originator after receiving Response | According to clause 10.1.4.1 in oneM2M-TS-0001. |
| Exceptions | According to clause 10.1.4.1 in oneM2M-TS-0001. |

FIG. 27 shows an example user interface for configuring a DLP and displaying information of a configured DLP. For example, the user interface may be used to configure the address including port number of a DLP; to configure types of SL information to be stored in a DLS; to display the address including port number of a DLP; and/or to display the consensus protocol used by the DLP FIG. 28 shows an example user interface for a DLP, which can display the following information: the address of associated SLNs; the last time when a SLN sends SL information or a DLS transaction to the DLP; and/or ledger-related information (e.g., the number of DLS transactions from or being generated for a SLN, the elapsed time from last transaction set, etc.).

Figure 29A:
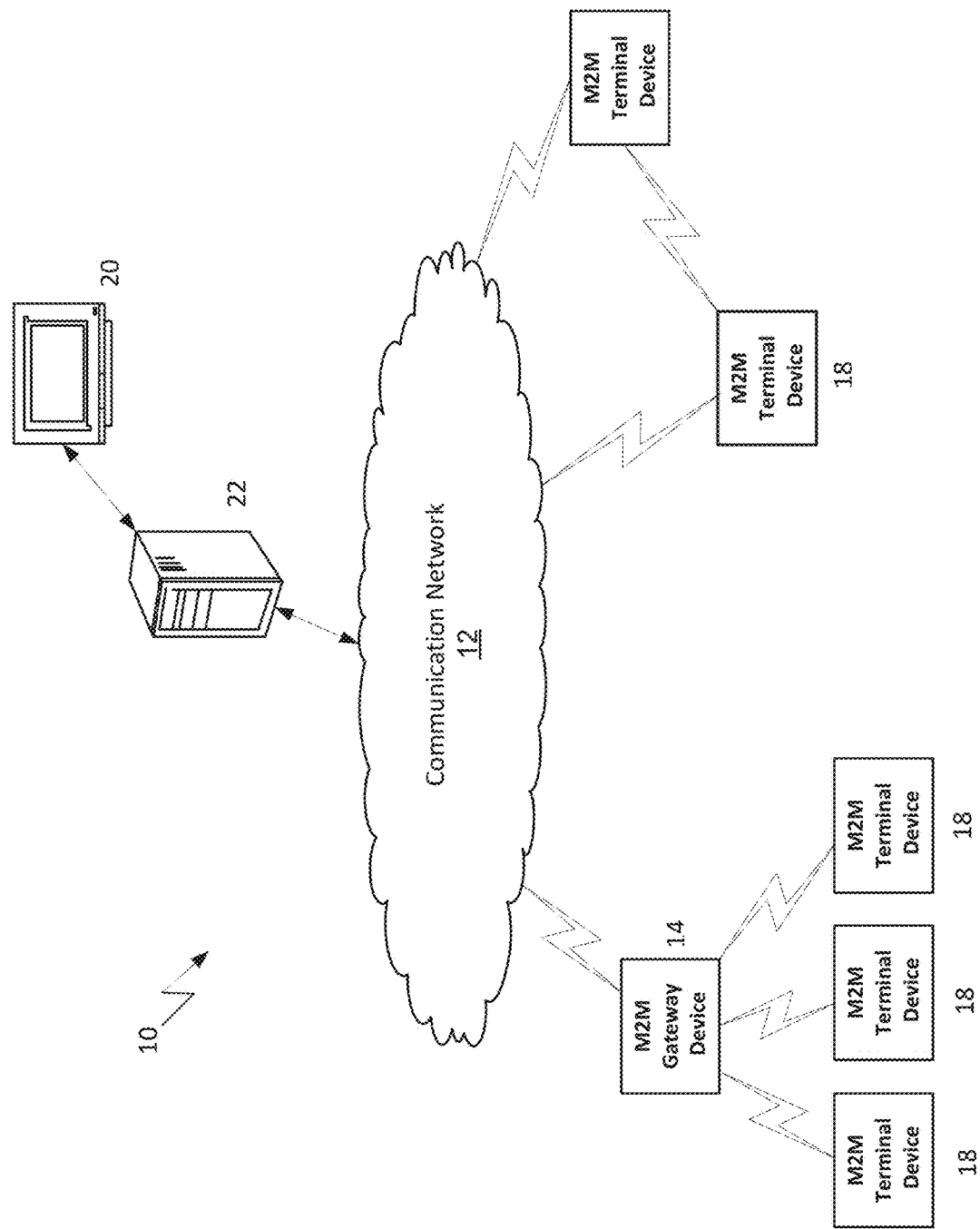
FIG. 29A shows an example system diagram of an example machine-to-machine (M2M) or Internet of Things (IoT) communication system in which one or more disclosed embodiments may be implemented.
Figure 29B:
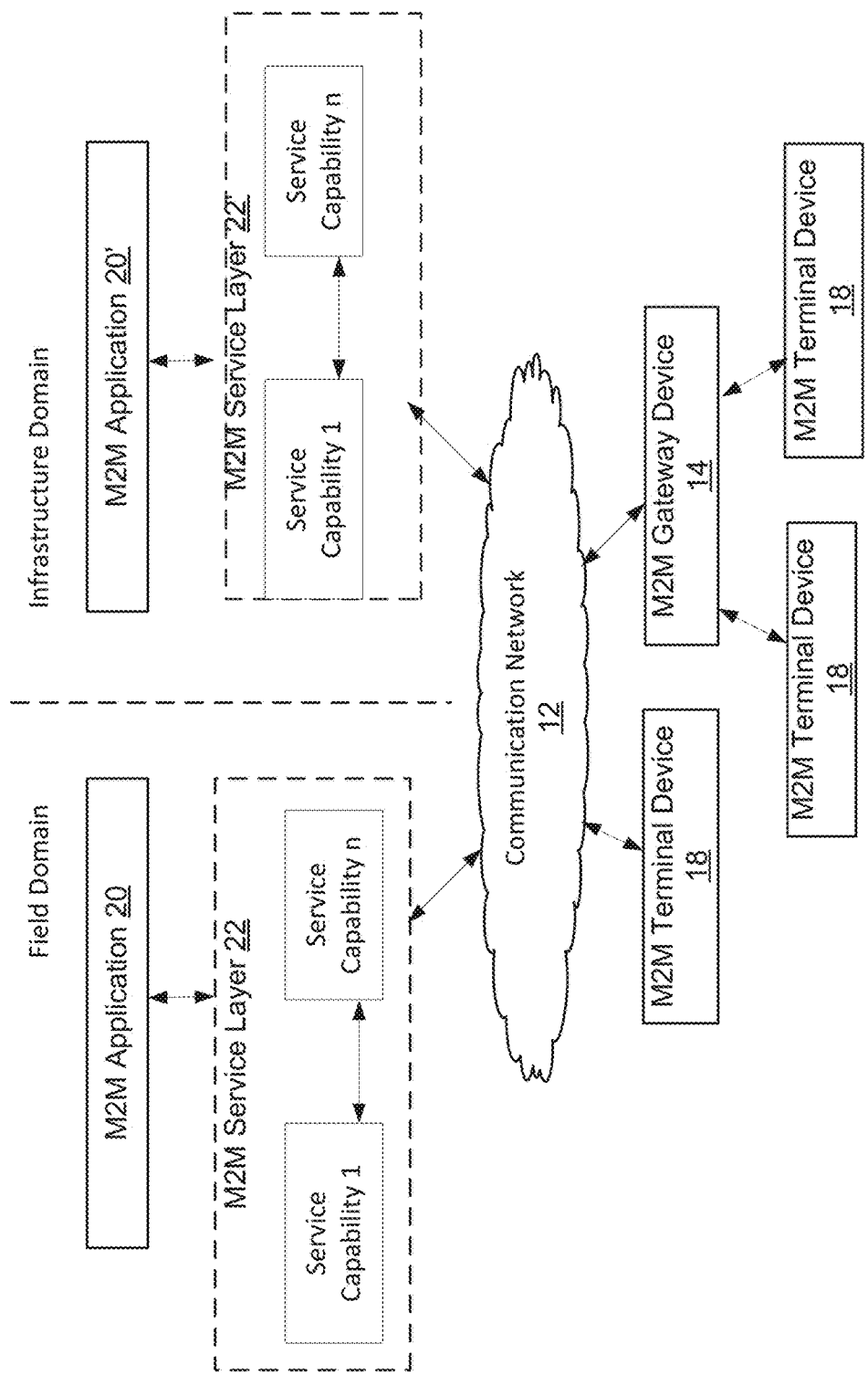
FIG. 29B shows an example system diagram of an example architecture that may be used within the M2M/IoT communications system illustrated in FIG. 29A.
Figure 29C:
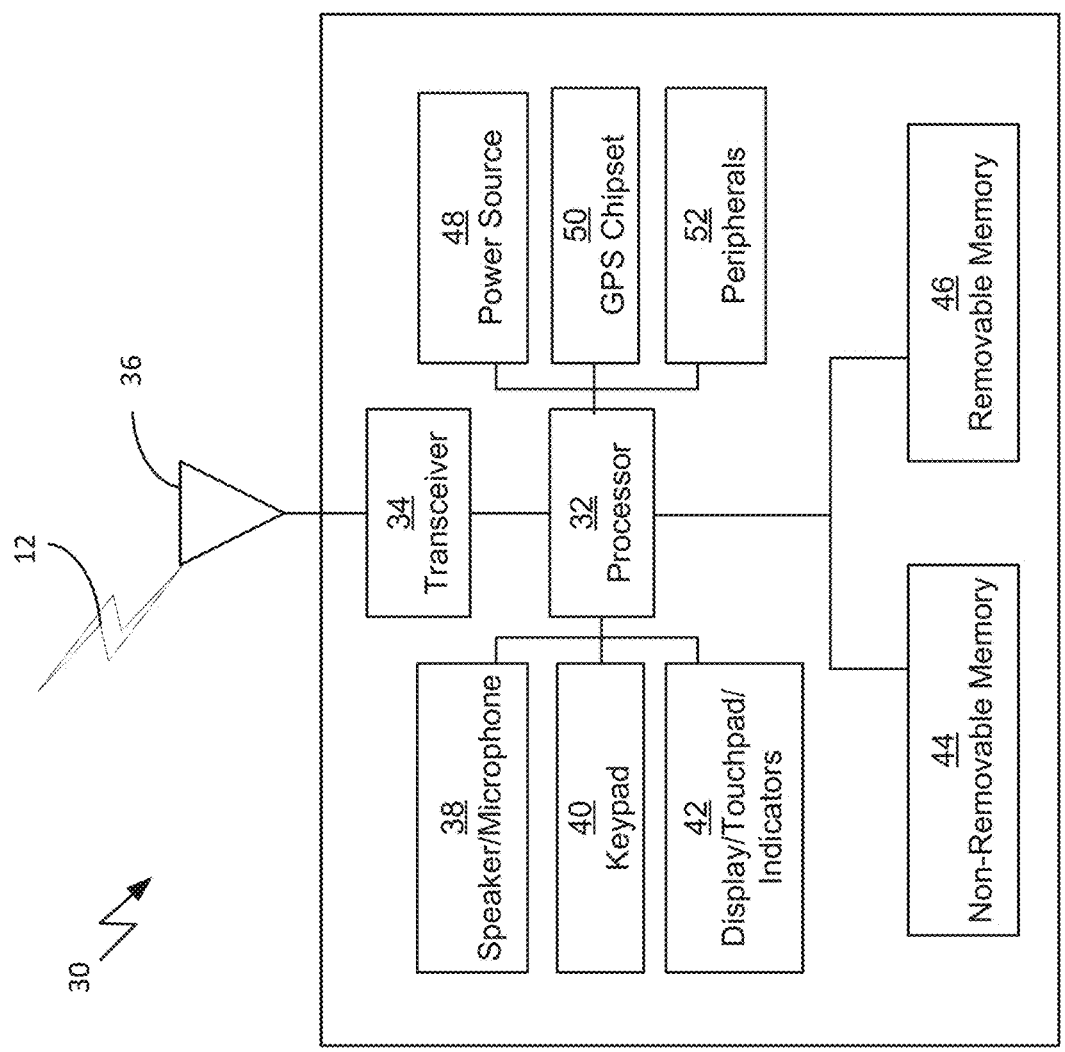
FIG. 29C shows an example system diagram of an example M2M/IoT terminal or gateway device that may be used within the communications system illustrated in FIG. 29A.
Figure 29D:
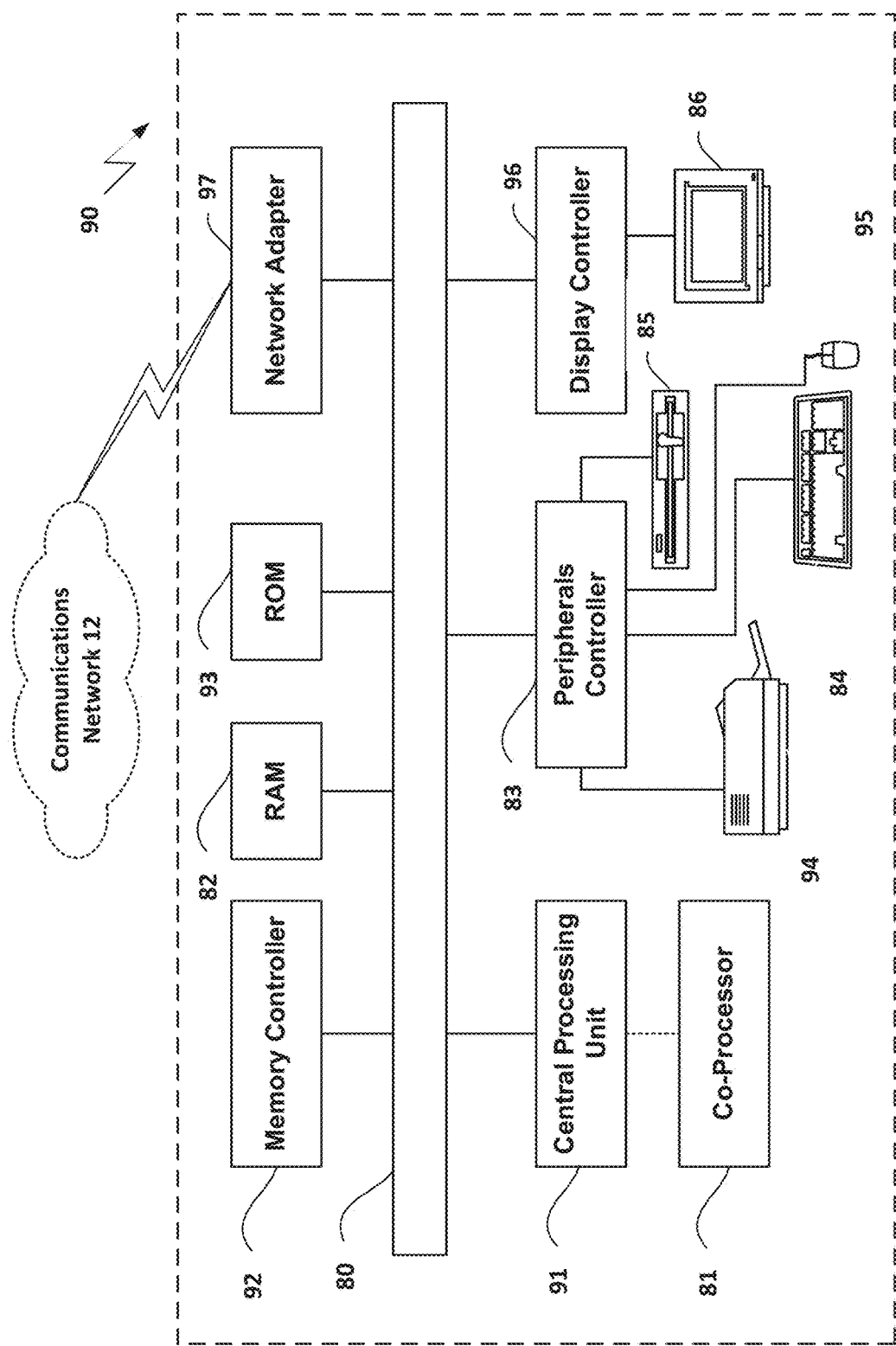
FIG. 29D shows an example block diagram of an example computing system in which aspects of the communication system of FIG. 29A may be embodied.

Any of the entities performing the steps illustrated in FIGS. 1-22, 24 and 26, such as the service layer, service layer device, service layer application, application entity, and the like, may be logical entities that may be implemented in the form of software (i.e., computer-executable instructions) stored in a memory of, and executing on a processor of, an apparatus configured for wireless and/or network communications or a computer system such as those illustrated in FIG. 29C or FIG. 29D. That is, the method(s) illustrated in FIGS. 1, 3, 6-18, 20 and 21 may be implemented in the form of software (i.e., computer-executable instructions) stored in a memory of an apparatus, such as the apparatus or computer system illustrated in FIG. 29C or FIG. 29D, which computer executable instructions, when executed by a processor of the apparatus, perform the steps illustrated in FIGS. 1, 3, 6-18, 20 and 21. It is also understood that any transmitting and receiving steps illustrated in FIGS. 1, 3, 6-18, 20 and 21 may be performed by communication circuitry of the apparatus/entity under control of the processor of the apparatus and the computer-executable instructions (e.g., software) that it executes.

FIG. 29A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-22, 24 and 26 may comprise a network apparatus of a communication system, such as the ones illustrated in FIGS. 29A-29D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 29A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 29A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 29B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 29B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 29B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 29C or FIG. 29D described below.

Further, the methods and functionalities described herein may be implemented as part of an M2M network that uses a Service Oriented Architecture (SOA) and/or a Resource-Oriented Architecture (ROA) to access services.

From a deployment perspective, a service layer can be deployed on various types of network nodes including servers, gateways and devices as shown in the various figures herein. Any such node, server, gateway, device, apparatus, or other logical entity of a communications network that implements service layer functionality or otherwise incorporates an instance of a service layer may be referred to herein as a service layer entity.

FIG. 29C is a block diagram of an example hardware/software architecture of an apparatus of a network, such as one of the entities illustrated in FIGS. 1-22, 24 and 26, which may operate as an M2M server, gateway, device, or other network apparatus in an M2M network such as that illustrated in FIGS. 29A and 29B. As shown in FIG. 29D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the methods for interworking between a service layer system and a distributed ledger system, such as the methods operations illustrated and described in relation to FIGS. 1-22, 24 and 26.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 29C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 1-22, 24 and 26) and in the claims. While FIG. 29C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 29C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in one of FIGS. 27 and 28 and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 29C is a block diagram of an example computing system 90 which may also be used to implement one or more network apparatuses of a network, such as the entities illustrated in FIGS. 1-22, 24 and 26 and described herein, which may operate as an M2M server, gateway, device, or other network apparatus in an M2M network such as that illustrated in FIGS. 29A and 29B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 29D and its accompanying description.

Further, computing system 90 may contain communication circuitry, such as for example a network adaptor 97, that may be used to connect computing system 90 to an external communications network, such as network 12 of FIG. 29A-29D, to enable the computing system 90 to communicate with other apparatuses of the network. The communication circuitry, alone or in combination with the CPU 91, may be used to perform the transmitting and receiving steps described herein (e.g., in FIGS. 1-22, 24 and 26) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

AE Application Entity
BC Blockchain
CSE Common Service Entity
CSF Common Service Function
DL Distributed Ledger DLN Distributed Ledger Node
DLP Distributed Ledger Proxy
DLS Distributed Ledger System
DNS Domain Name System
DNS-SD DNS-based Service Discovery
ID Identifier
IoT Internet of Things
M2M Machine-to-Machine
P2P Peer-to-Peer
PoW Proof-of-Work
SL Service Layer
SLN Service Layer Node
SLS Service Layer System
URI Uniform Resource Identifier
UTXO Unspent Transaction Output The following is a list of terms and definitions relating to service layer technologies that may appear in the above description. Unless otherwise specified, the terms and definitions used herein refer to the corresponding term listed below:

| Term | Definition |
| --- | --- |
| Service Layer | A protocol layer between applications and application protocol layers. A service layer stores resources and provides services, which are exposed to and can be accessed and manipulated by applications and other service layers. |
| Service Layer Node | A logical entity which implements service layer protocols and interacts with other Service Layer Nodes (SLNs). |
| Service Layer System | The system which consists of service layer nodes implementing the same service layer protocol. |
| Distributed Ledger | A distributed append-only database that is maintained by and at different Distributed Ledger Nodes (DLNs). The ledger maintained at each DLN is identical. The ledger basically contains transactions which are grouped together in various structures (e.g., Blockchain in Bitcoin system). |
| Distributed Ledger System | The system that consists of DLNs working together but in a distributed way to create and maintain distributed ledgers. In general, those DLNs are connected and communicate with each other over an underlying Peer-to-Peer (P2P) network. For example, Bitcoin system is a Distributed Ledger System (DLS). |
| Distributed Ledger Node | A logical node where a ledger is created and maintained. A DLN has several other DLNs as its peers. Each DLN can generate new messages to its peer DLNs and will also forward any received messages to its peer DLNs (except the one where the message was received from) according to underlying P2P network protocols. There is no assumption that DLNs trust each other. A DLN could be a "full DLN" (one where a complete ledger is maintained) or a "light DLN" (one that does not maintain a complete ledger). |
| Transaction | The minimum message unit being transmitted among DLNs in a DLS (also referred to as DLS Transaction). A DLN (e.g., a payer in Bitcoin systems) can issue a transaction to another DLN (e.g., a payee in Bitcoin systems). Each issued transaction will be sent to and forwarded by the issuer's peer DLNs based on underlying P2P protocols and eventually it will be received by all DLNs in the DLS. Since DLNs work in a distributed way, they need to reach a consensus on all transactions sent over the DLS before the transactions are validated and stored in distributed ledgers, via certain consensus protocols. The status of a transaction could be: generated by a DLN, sent to the DLS (or received by DLNs from the DLS), appended to distributed ledgers and confirmed by the DLS (e.g., after running the consensus protocol at each participating DLN) |
| Transaction Set | A structure which groups several transactions together (e.g., Block in Bitcoin systems). In some DLSs, consensus protocols are executed over each transaction set instead of a single transaction to improve efficiency. |
| Consensus Protocol | The protocol used by DLNs to reach consensus on all transactions sent over the DLS before they are validated and stored in distributed ledgers. An example of a consensus protocol is Proof-of-Work (PoW) used in Bitcoin systems and other DLSs built on top of Bitcoin systems. |
| Distributed Ledger Proxy | A logical node which has interface to both SLSs and DLSs. A Distributed Ledger Proxy (DLP) basically supports both service layer functions and distributed ledger functions. It could be a combination of a SLN and a full DLN. |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

The invention claimed is:

1. A method performed by a distributed ledger proxy for interworking a service layer system and a distributed ledger system, the method comprising:
receiving, from a service layer entity, a message comprising data for the service layer system to be stored at the distributed ledger system, wherein the service layer system is a middleware layer system providing service capabilities to a plurality of applications through a set of application programming interfaces (APIs);
generating, at the distributed ledger proxy and based on the data for the service layer system, a transaction in accordance with one or more specifications of the distributed ledger system;
sending, to the distributed ledger system, information associated with the transaction;
receiving, from the distributed ledger system, an indication that the transaction has been confirmed by the distributed ledger system; and
sending, to the service layer entity, a response to the indication that the transaction has been confirmed by the distributed ledger system.

2. The method of claim 1, further comprising generating a mapping between the data received from the service layer entity and the transaction.

3. The method of claim 1, wherein the indication that the transaction has been confirmed by the distributed ledger system comprises at least one of an identifier of the transaction, an identifier of the data received from the service layer entity, or a hash of the data received from the service layer entity.

4. The method of claim 1, further comprising sending, to the service layer entity and prior to receiving the indication that the transaction has been confirmed, a response comprising an indication that the transaction is awaiting confirmation by the distributed ledger system.

5. The method of claim 1, further comprising receiving, from the service layer entity, another message comprising other data, wherein the transaction is generated based on the data and the other data.

6. The method of claim 1, further comprising:
receiving, from the service layer entity, a request to retrieve one or more transactions from the distributed ledger system;
retrieving, from the distributed ledger system, information associated with the one or more transactions; and
sending, to the service layer entity, information associated with the one or more transactions.

7. The method of claim 1,
wherein the distributed ledger system comprises a plurality of distributed ledger nodes, and
wherein the message comprises an indication to store the data at a particular one of the distributed ledger nodes.

8. An apparatus for a distributed ledger proxy for interworking a service layer system and a distributed ledger system, the apparatus comprising circuitry configured to:
receive, from a service layer entity of the service layer system, a message comprising data to be stored at the distributed ledger system, wherein the service layer system is a middleware layer system providing service capabilities to a plurality of applications through a set of application programming interfaces (APIs);
generate, at the distributed ledger proxy and based on the data for the service layer system, a transaction in accordance with one or more specifications of the distributed ledger system;
send, to the distributed ledger system, information associated with the transaction;
receiving, from the distributed ledger system, an indication that the transaction has been confirmed by the distributed ledger system; and
send, to the service layer entity, a response to the indication that the transaction has been confirmed by the distributed ledger system.

9. The apparatus of claim 8, wherein the circuitry further configured to generate a mapping between the data received from the service layer entity and the transaction.

10. The apparatus of claim 8, wherein the indication that the transaction has been confirmed by the distributed ledger system comprises at least one of an identifier of the transaction, an identifier of the data received from the service layer entity, or a hash of the data received from the service layer entity.

11. The apparatus of claim 8, wherein the circuitry further configured to send, to the service layer entity and prior to receiving the indication that the transaction has been confirmed, a response comprising an indication that the transaction is awaiting confirmation by the distributed ledger system.

12. The apparatus of claim 8, wherein the circuitry further configured to receive, from the service layer entity, another message comprising other data, wherein the transaction is generated based on the data and the other data.

13. The apparatus of claim 8, wherein the circuitry further configured to:
receive, from the service layer entity, a request to retrieve one or more transactions from the distributed ledger system;
retrieve, from the distributed ledger system, information associated with the one or more transactions; and
send, to the service layer entity, information associated with the one or more transactions.

14. The apparatus of claim 8,
wherein the distributed ledger system comprises a plurality of distributed ledger nodes, and
wherein the message comprises an indication to store the data at a particular one of the distributed ledger nodes.

15. A non-transitory computer-readable storage medium storing computer-executable instructions which, when executed by a processor, implement a distributed ledger proxy for interworking a service layer system and a distributed ledger system, and cause the distributed ledger proxy to perform operations comprising:
receiving, from a service layer entity, a message comprising data to be stored at the distributed ledger system, wherein the service layer system is a middleware layer system providing service capabilities to a plurality of applications through a set of application programming interfaces (APIs);

generating, at the distributed ledger proxy and based on the data for the service layer system, a transaction in accordance with one or more specifications of the distributed ledger system;

sending, to the distributed ledger system, information associated with the transaction;

receiving, from the distributed ledger system, an indication that the transaction has been confirmed by the distributed ledger system; and sending, to the service layer entity, a response to the indication that the transaction has been confirmed by the distributed ledger system.

16. The non-transitory computer-readable storage medium of claim 15, wherein the instructions when executed further cause the distributed ledger proxy to perform operations comprising generating a mapping between the data received from the service layer entity and the transaction.

17. The non-transitory computer-readable storage medium of claim 15, wherein the indication that the transaction has been confirmed by the distributed ledger system comprises at least one of an identifier of the transaction, an identifier of the data received from the service layer entity, or a hash of the data received from the service layer entity.

18. The non-transitory computer-readable storage medium of claim 15, wherein the instructions when executed further cause the distributed ledger proxy to perform operations comprising sending, to the service layer entity and prior to receiving the indication that the transaction has been confirmed, a response comprising an indication that the transaction is awaiting confirmation by the distributed ledger system.

19. The non-transitory computer-readable storage medium of claim 15, wherein the instructions when executed further cause the distributed ledger proxy to perform operations comprising receiving, from the service layer entity, another message comprising other data, wherein the transaction is generated based on the data and the other data.

20. The non-transitory computer-readable storage medium of claim 15,
wherein the distributed ledger system comprises a plurality of distributed ledger nodes, and
wherein the message comprises an indication to store the data at a particular one of the distributed ledger nodes.

* * * * *